(12) United States Patent
Hiroki et al.

(10) Patent No.: US 10,729,978 B2
(45) Date of Patent: Aug. 4, 2020

(54) INFORMATION STORAGE MEDIUM, INFORMATION PROCESSING DEVICE, AND GAME SYSTEM

(71) Applicant: BANDAI NAMCO Entertainment Inc., Tokyo (JP)

(72) Inventors: Tomoko Hiroki, Tokyo (JP); Souya Mikumo, Tokyo (JP); Seiji Fukumoto, Yokohama (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 48 days.

(21) Appl. No.: 16/157,693

(22) Filed: Oct. 11, 2018

(65) Prior Publication Data

US 2019/0111344 A1    Apr. 18, 2019

(30) Foreign Application Priority Data

Oct. 13, 2017 (JP) ................................. 2017-199396

(51) Int. Cl.
*A63F 13/58* (2014.01)
*A63F 13/69* (2014.01)
*A63F 13/35* (2014.01)
*A63F 13/833* (2014.01)
*A63F 13/537* (2014.01)

(52) U.S. Cl.
CPC .............. *A63F 13/58* (2014.09); *A63F 13/35* (2014.09); *A63F 13/537* (2014.09); *A63F 13/69* (2014.09); *A63F 13/833* (2014.09)

(58) Field of Classification Search
USPC .......................................................... 463/43
See application file for complete search history.

(56) References Cited

U.S. PATENT DOCUMENTS

| 6,769,988 | B1 * | 8/2004 | Sato ........................ A63F 13/10 463/38 |
| 8,628,397 | B2 * | 1/2014 | Kusuda ................... A63F 13/12 463/17 |
| 2003/0144045 | A1 * | 7/2003 | Fujita ....................... G06T 13/40 463/1 |

(Continued)

FOREIGN PATENT DOCUMENTS

JP    2001-000737 A    1/2001

*Primary Examiner* — Pierre E Elisca
(74) *Attorney, Agent, or Firm* — Posz Law Group, PLC

(57) ABSTRACT

An information processing device that carries out the processing of a fighting game in which a player-character is made to fight an opponent-character, the device including a first condition determination means that determines whether the player-character and the opponent-character, as a whole, have fulfilled a first condition during the fight; a second condition determination means that determines a character, among the player-character and the opponent-character, that has fulfilled a second condition during the fight; and a bonus awarding means that awards a bonus that can be used in the fight to a fulfilling character, among the player-character and the opponent-character, that fulfills the second condition after the fulfillment of the first condition. The first condition determination means sets a partial or a complete fulfillment of a given set of conditions as the first condition.

20 Claims, 9 Drawing Sheets

(56) References Cited

U.S. PATENT DOCUMENTS

| | | | |
|---|---|---|---|
| 2008/0287175 A1* | 11/2008 | Kusuda | G07F 17/3267 463/17 |
| 2015/0080123 A1* | 3/2015 | Motokura | A63F 13/56 463/31 |
| 2018/0056196 A1* | 3/2018 | Konno | A63F 13/822 |
| 2020/0114267 A1* | 4/2020 | Sakurai | A63F 13/79 |

* cited by examiner

| USER INFORMATION | | | |
|---|---|---|---|
| USER ID | USER REGISTRATION INFORMATION | AVAILABLE CHARACTER | LEVEL |
| 001 | MAN FROM TOKYO IN HIS TWENTIES | A、B、C、D | LV10 |
| 002 | MAN FROM TOKYO IN HIS THIRTIES | A、B、C | LV5 |
| ⋮ | ⋮ | ⋮ | ⋮ |

FIG. 4

| GAME DATA | | | | | | |
|---|---|---|---|---|---|---|
| USER ID | CHARACTER USED | PARAMETER | | | ITEM ID | SPECIAL ITEM ACQUISITION COUNT |
| | | STAMINA | SKILLS | COMBO COUNT BY SPECIFIC SKILL | | |
| 007 | A | 6 | 7 | 0 | 010 / 011 / 020 / ⋮ | 3 |
| 010 | E | 6 | 7 | 0 | 001 / 009 / 020 / ⋮ | 2 |

FIG. 5

| CHARACTER TABLE | | |
|---|---|---|
| CHARACTER | ATTRIBUTE | SPECIFIC SKILLS |
| A | a | HIGH KICK, LEG SWEEP ... |
| B | b | PUNCH, ELBOW STRIKE ... |
| ⋮ | ⋮ | ⋮ |

FIG. 6

INFORMATION STORAGE MEDIUM, INFORMATION PROCESSING DEVICE, AND GAME SYSTEM

This application claims the benefit of Japanese Patent Application No. 2017-199396, filed on Oct. 13, 2017, the entire disclosure of which is incorporated by reference herein.

BACKGROUND OF THE INVENTION

The present invention relates to an information storage medium, an information processing device, and a game system.

In many fighting games, a variety of parameters are assigned to each player-character and opponent-character and simple rules are established. For example, when a specific parameter (e.g., a stamina parameter (discussed later)) of a character reaches zero within a time limit, that character loses or, when the time limit has elapsed, the character for which the specific parameter is relatively lower loses. In such games, the player can advance through the battle by causing the player-character to perform required actions while predicting the actions of the opponent-character on the basis of a skill gauge (gauge that reflects the skill parameter (described later)) of the opponent-character displayed on the game screen. For example, a player of the fighting game described in JP-A-2001-000737 can apply a change to the combat power parameter of the player-character by performing a predetermined key operation after the player-character as completed a specific action.

However, in this case, the actions of the opponent-character can be easily predicted from the skill gauge and, consequently, strategies available to the player lack diversity and there is a need for measures to increase interest in the combat itself.

SUMMARY

The invention provides an information storage medium, an information processing device, and a game system capable of providing a player with a fighting game rich with strategic diversity and excitement due to the direction of the fight being difficult to predict and the provision of a wide range of strategic possibilities.

According to a first aspect of the invention, there is provided a non-transitory computer-readable information storage medium storing a program for a computer that executes processing of a fighting game in which a player-character is made to fight an opponent-character, the program causing the computer to function as:

first condition determination means that determines whether or not the player-character and the opponent-character, as a whole, have fulfilled a first condition during the fight;

second condition determination means that determines a character, among the player-character and the opponent-character, that has fulfilled a second condition during the fight; and bonus awarding means that awards a bonus that can be used in the fight to a fulfilling character, among the player-character and the opponent-character, that fulfills the second condition after the fulfillment of the first condition, the first condition determination means setting a partial or a complete fulfillment of a given set of conditions as the first condition.

According to a second aspect of the invention, there is provided an information processing device that executes processing of a fighting game in which a player-character is made to fight an opponent-character, the device comprising:

first condition determination means that determines whether or not the player-character and the opponent-character, as a whole, have fulfilled a first condition during the fight;

second condition determination means that determines a character, among the player-character and the opponent-character, that has fulfilled a second condition during the fight; and bonus awarding means that awards a bonus that can be used in the fight to a fulfilling character, among the player-character and the opponent-character, that fulfills the second condition after the fulfillment of the first condition.

According to a third aspect of the invention, there is provided a game system that executes processing of a fighting game in which a player-character is made to fight an opponent-character, the game system comprising:

first condition determination means that determines whether or not the player-character and the opponent-character, as a whole, have fulfilled a first condition during the fight;

second condition determination means that determines a character, among the player-character and the opponent-character, that has fulfilled a second condition during the fight; and bonus awarding means that awards a bonus that can be used in the fight to a fulfilling character, among the player-character and the opponent-character, that fulfills the second condition after the fulfillment of the first condition.

BRIEF DESCRIPTION OF THE SEVERAL VIEWS OF THE DRAWINGS

FIG. 4 is an example of a drawing explaining user information registered in the terminal device.

FIG. 5 is an example of a drawing explaining game data related to a fighting game.

FIG. 6 is an example of a drawing explaining a character table related to the fighting game.

Figure 1:
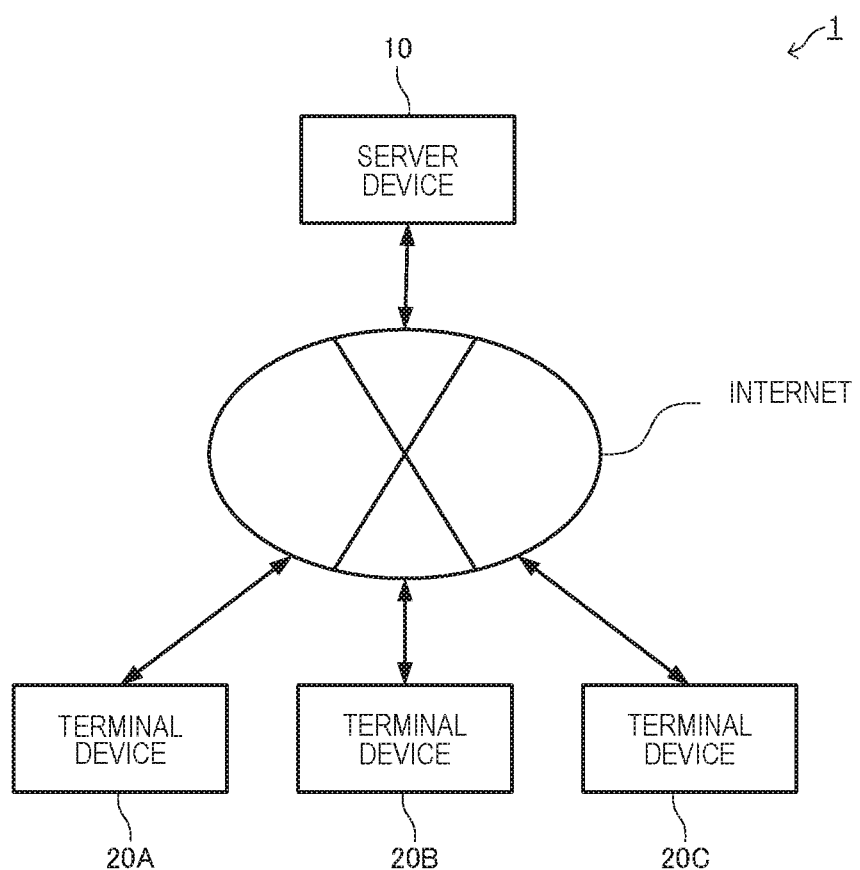
FIG. 1 is a diagram illustrating an example of the configuration of a game system according to an embodiment of the invention.

DETAILED DESCRIPTION OF THE EMBODIMENT (1) According to an embodiment of the invention, there is provided a non-transitory computer-readable information storage medium storing a program for a computer that executes processing of a fighting game in which a player-character is made to fight an opponent-character, the program causing the computer to function as:

first condition determination means that determines whether or not the player-character and the opponent-character, as a whole, have fulfilled a first condition during the fight;

second condition determination means that determines a character, among the player-character and the opponent-character, that has fulfilled a second condition during the fight; and bonus awarding means that awards a bonus that can be used in the fight to a fulfilling character, among the player-character and the opponent-character, that fulfills the second condition after the fulfillment of the first condition, the first condition determination means setting a partial or a complete fulfillment of a given set of conditions as the first condition.

As a result of this configuration, when (i) the player-character fulfills the first condition, (ii) the opponent-character (other player-character or NPC) fulfills the first condition, or (iii) the player-character and the opponent-character cooperate to fulfill the first condition, a bonus is awarded to the fulfilling character that fulfills the second condition (note that "bonus" can also be interpreted as "reward"). Specifically, this embodiment has a configuration in which the player-character and the opponent-character must, as a whole, fulfill the first condition for the player-character to acquire a bonus. However, provided that the player-character fulfills the second condition after the fulfillment of the first condition, the player-character can acquire a bonus regardless of the degree of contribution of the player-character to the fulfillment of the first condition. As such, to advance the fighting game in an advantageous manner, the player must develop a game strategy to engage the player-character in the fulfillment of the second condition after the fulfillment of the first condition, or a game strategy to prevent the engagement of the opponent-character in the fulfillment of the second condition after the fulfillment of the first condition. As a result, a player can be provided with a fighting game rich with strategic diversity and excitement due to the direction of the fight being difficult to predict and the provision of a wide range of strategic possibilities.

(2) In the information storage medium described above, the first condition determination means may set fulfillment of the given set of conditions as the first condition.

As a result of this configuration, each condition of the set of conditions must be fulfilled in order to fulfill the first condition and, as such, a given cost (time and effort) is required for the fulfillment of the first condition. Accordingly, when a character contributes to the fulfillment of the first condition but does not achieve fulfillment of the second condition, the loss feeling (feeling of loss) of the player controlling that character can be increased, and when a character does not contribute to the fulfillment of the first condition but achieves fulfillment of the second condition, the advantage feeling (feeling of advantage) of the player controlling that character can be increased.

(3) In the information storage medium described above, the first condition determination means may set partial fulfillment of the given set of conditions as the first condition; and the second condition determination means may set fulfillment of a remaining condition of the set of conditions as the second condition.

As a result of this configuration, each condition of the set of conditions must be fulfilled for the fulfillment of the second condition. As such, when a character contributes to the fulfillment of many of the conditions of the set of conditions but does not achieve fulfillment of the remaining condition, the loss feeling (feeling of loss) of the player controlling that character can be increased, and when a character does not contribute to the fulfillment of many of the conditions of the set of conditions but achieves fulfillment of the remaining condition, the advantage feeling (feeling of advantage) of the player controlling that character can be increased.

(4) In the information storage medium described above, the first condition determination means may present whether or not the first condition is fulfilled or a degree of fulfillment of the first condition to the player.

As a result of this configuration, the player can ascertain whether the first condition is fulfilled or the degree of fulfillment of the first condition. As such, the player can strategically determine the actions of the player-character needed for bonus acquisition (i.e., to fulfill the second condition).

(5) In the information storage medium described above, the first condition determination means may present, to the player, a degree of contribution to the fulfillment of the first condition by each of the player-character and the opponent-character.

As a result of this configuration, when the contribution of the player-character to the fulfillment of the first condition is comparatively large, the player understands that there is a possibility of the cost (time and effort) spent theretofore being for nothing, and when the contribution of the player-character to the fulfillment of the first condition is comparatively small, the player understands that there is a possibility of obtaining a large advantage at a low cost (time and effort).

(6) In the information storage medium described above, the first condition determination means may determine an action required to fulfill the first condition for each of the player-character and the opponent-character.

As a result of this configuration, the player must cause their own player-character to perform an action specified for that player-character in order to fulfill the first condition. Accordingly, a situation can be created in which action tendencies during the fight differ by character.

(7) In the information storage medium described above, the bonus awarding means may set, as the fulfilling character, only a character, among the player-character and the opponent-character, that fulfills the second condition first after the fulfillment of the first condition.

As a result of this configuration, the player-character and the opponent-character must compete to fulfill the second condition fastest after the fulfillment of the first condition (competition where the fastest character wins). Therefore, the players can be prompted to shorten the time to fulfill the second condition after the fulfillment of the first condition, and the feeling of speed of the fight can be enhanced.

(8) In the information storage medium described above, when the player-character is the fulfilling character, the bonus awarding means may present candidates for the bonus to the player in a selectable manner, and cause the player to select a portion of the candidates as the bonus.

As a result of this configuration, the player selects, as the bonus, an appropriate candidate from among a plurality of candidates, thereby making it possible to advantageously advance the subsequent fight. Accordingly, the act of the player selecting the bonus itself can dictate the direction of the fight.

(9) In the information storage medium described above, the bonus awarding means may determine the candidates based on a degree of contribution of the fulfilling character to the fulfillment of the first condition.

As a result of this configuration, the degree of contribution of the fulfilling character to the fulfillment of the first condition is related to the content of the bonus. As such, there is a possibility that the cost (time and effort) spent in the fulfillment of the first condition can be recovered. In one example, as the degree of contribution increases, bonuses with greater effects are added as the bonus candidates.

(10) In the information storage medium described above, the bonus awarding means may determine a value of the bonus based on a degree of contribution of the fulfilling character to the fulfillment of the first condition.

As a result of this configuration, the degree of contribution of the fulfilling character to the fulfillment of the first condition is related to the value of the bonus. As such, there is a possibility that the cost (time and effort) spent in the fulfillment of the first condition can be recovered. In one example, as the degree of contribution increases, the effects of the bonus candidates are enhanced.

(11) In the information storage medium described above, the first condition determination means may allow each of the player-character and the opponent-character to exchange a consumption of a given parameter assigned to each of the player-character and the opponent-character for an action required to fulfill the first condition, and the second condition determination means may set a recovery of the given parameter as the second condition.

As a result of this configuration, consumption of the parameter is required to fulfill the first condition, and recovery of the same parameter is required to fulfill the second condition. As such, a trade-off relationship is established in which fulfillment of the second condition becomes difficult if the player-character excessively consumes the parameter to fulfill the first parameter, and fulfillment of the first condition becomes difficult to fulfill if the player-character excessively saves the parameter to fulfill the second condition. Accordingly, interest in the act of acquiring the bonus itself is enhanced even more. Note that, "recovery of the parameter" includes recovery of the parameter to a maximum value, recovery of the parameter to a predetermined value less than the maximum value, and the like.

(12) In the information storage medium described above, in a case in which the bonus has been awarded to the fulfilling character, the bonus awarding means may be configured to not award the bonus to a subsequent fulfilling character during a period until an end of the fight, even if a fulfilling character is generated.

In this case, the opportunity to obtain a bonus by fulfilling the second condition is limited and, as such, the value of the bonus can be enhanced. In addition, the player can enjoy a strategy in which the player determines, at their own will, the fulfillment timing (or timing of acquiring the bonus) of the second condition and obtains the bonus at a more beneficial timing.

(13) According to an embodiment of the invention, there is provided an information processing device that executes processing of a fighting game in which a player-character is made to fight an opponent-character, the device comprising:

first condition determination means that determines whether or not the player-character and the opponent-character, as a whole, have fulfilled a first condition during the fight;

second condition determination means that determines a character, among the player-character and the opponent-character, that has fulfilled a second condition during the fight; and bonus awarding means that awards a bonus that can be used in the fight to a fulfilling character, among the player-character and the opponent-character, that fulfills the second condition after the fulfillment of the first condition.

As a result of this configuration, when (i) the player-character fulfills the first condition, (ii) the opponent-character (other player-character or NPC) fulfills the first condition (e.g., acquiring seven special items), or (iii) the player-character and the opponent-character cooperate to fulfill the first condition, a bonus is awarded to the fulfilling character that fulfills the second condition. Specifically, this embodiment has a configuration in which the player-character and the opponent-character must, as a whole, fulfill the first condition for the player-character to obtain a bonus. However, provided that the player-character fulfills the second condition after the fulfillment of the first condition, the player-character can obtain a bonus regardless of the degree of contribution of the player-character to the fulfillment of the first condition. As such, to advance the fighting game in an advantageous manner, the player must develop a game strategy to engage the player-character in the fulfillment of the second condition after the fulfillment of the first condition, or a game strategy to prevent the engagement of the opponent-character in the fulfillment of the second condition after the fulfillment of the first condition. As a result, a player can be provided with a fighting game rich with strategic diversity and excitement due to the direction of the fight being difficult to predict and the provision of a wide range of strategic possibilities.

(14) According to an embodiment of the invention, there is provided a game system that executes processing of a fighting game in which a player-character is made to fight an opponent-character, the game system comprising:

first condition determination means that determines whether or not the player-character and the opponent-character, as a whole, have fulfilled a first condition during the fight;

second condition determination means that determines a character, among the player-character and the opponent-character, that has fulfilled a second condition during the fight; and bonus awarding section that awards a bonus that can be used in the fight to a fulfilling character, among the player-character and the opponent-character, that fulfills the second condition after the fulfillment of the first condition.

As a result of this configuration, when (i) the player-character fulfills the first condition, (ii) the opponent-character (other player-character or NPC) fulfills the first condition, or (iii) the player-character and the opponent-character cooperate to fulfill the first condition, a bonus is awarded to the fulfilling character that fulfills the second condition. Specifically, this embodiment has a configuration in which the player-character and the opponent-character must, as a whole, fulfill the first condition for the player-character to obtain a bonus. However, provided that the player-character fulfills the second condition after the fulfillment of the first condition, the player-character can obtain a bonus regardless of the degree of contribution of the player-character to the fulfillment of the first condition. As such, to advance the fighting game in an advantageous manner, the player must develop a game strategy to engage the player-character in the fulfillment of the second condition after the fulfillment of the first condition, or a game strategy to prevent the engagement of the opponent-character in the fulfillment of the second condition after the fulfillment of the first condition. As a result, a player can be provided with a fighting game rich with strategic diversity and excitement due to the direction of the fight being difficult to predict and the provision of a wide range of strategic possibilities.

1. Game System

First, an overview and schematic configuration of a game system 1 according to an embodiment of the invention is described with reference to FIG. 1. FIG. 1 is a diagram illustrating an example of the configuration of the game system 1. A portion of the constituents of FIG. 1 may be omitted.

As illustrated in FIG. 1, the game system 1 includes a server device 10 that provides the game service, and a plurality of terminal devices 20A, 20B, 20C, and so on. Each of the plurality of terminal devices 20A, 20B, 20C, and so on is a home game device, for example. However, each of the plurality of terminal devices 20A, 20B, 20C, and so on may be a commercial game device. The server device 10 and each of the plurality of terminal devices 20A, 20B, 20C, and so on are configured to be connectable to the internet (example of a network; an intranet is also possible). Hereinafter, when describing matters that are common among the plurality of terminal devices 20A, 20B, 20C, and so on, the term "terminal device 20" is used.

The server device 10 provides the program of a game such as a fighting game to the terminal device 20 across the internet. The terminal device 20 downloads the program from the server device 10 across the internet, writes the downloaded program to internal memory (memory section 270, described later), and executes the game in accordance with the program. The user (player) of the terminal device 20 plays the game executed by the terminal device 20.

Note that, the program may be stored on a data storage medium (reference sign 280 in FIG. 3) that is readable by the terminal device 20. Additionally, the game may be executed by the terminal devices 20 alone, or the server device 10 and the terminal device 20 may cooperate to execute the game.

Moreover, the server device 10 may manage user registration information of the user of each of the terminal devices 20A, 20B, 20C, and so on, and may execute a process to provide a service related to communication between the plurality of users.

2. Server Device

Figure 2:
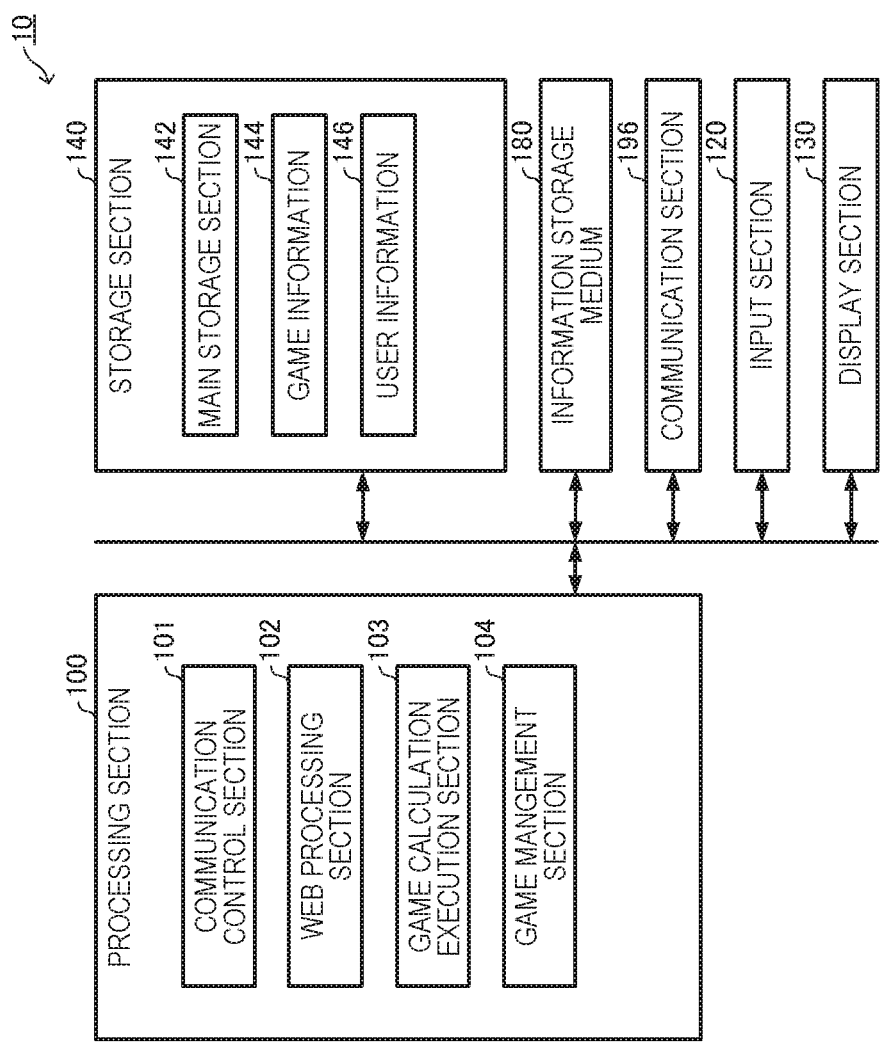
FIG. 2 is an example of a functional block diagram illustrating the configuration of a server device.

Next, the server device 10 is described while referencing FIG. 2. FIG. 2 is a diagram illustrating the functional blocks of the server device 10. A portion of the constituents of FIG. 2 may be omitted.

The server device 10 includes an input section 120 to be used by an administrator or for other inputting, a display section 130 that performs predetermined displaying, an information storage medium 180 on which predetermined information is stored, a communication section 196 that carries out communication with the terminal device 20 and other devices, a processing section 100 that primarily executes processes related to the provided game, and a storage section 140 that primarily stores the various types of data used in the game.

The input section 120 is used by the system administrator or the like to implement settings related to the game and other required settings, and to input data. For example, the input section 120 is implemented by a mouse, a keyboard, or the like.

The display section 130 displays operation screens for use by the system administrator. For example, the display section 130 is implemented by a liquid crystal display or the like.

The information storage medium 180 (computer-readable medium) stores programs, data, and the like. The information storage medium 180 is implemented by an optical disk (CD or DVD), a magneto-optical (MO) disk, a magnetic disk, a hard disk, magnetic tape, memory (ROM), or the like.

The communication section 196 carries out various types of control to communicate with external devices (e.g., terminals, other servers, and other network systems). The functions of the communication section 196 are implemented by hardware such as various processors or a communication ASIC, programs, and the like.

The storage section 140 serves as a work area for the processing section 100, the communication section 196, and the like. The functions of the storage section 140 are implemented by RAM (VRAM) or the like. Note that the information stored in the storage section 170 may be managed in a database.

Moreover, in the present embodiment, the storage section 170 stores game information 144 representing information related to the provided game, user information 146 related to the provided game and representing information related to the player as a player, and other various types of information required to carry out game calculations.

The processing section 100 performs various processes using a main storage section 142 within the storage section 140 as a work area. The functions of the processing section 100 may be implemented by hardware such as a processor (e.g., CPU or DSP) or an ASIC (e.g., gate array), and a program.

The processing section 100 performs the various processes of the present embodiment on the basis of a program (data) stored on the information storage medium 180. Specifically, a program that causes the computer to function as each section of the present embodiment (i.e., a program that causes the computer to perform the process of each section) is stored in the information storage medium 180.

For example, the processing section 100 (processor) controls the entire server device 10 and performs a variety of processes, such as controlling the transfer of data and the like between the various sections, on the basis of the program stored on the information storage medium 180. Furthermore, the processing section 100 performs processes for providing various types of services according to requests from the terminal device 20. In one example, the processing section 100 includes at least a communication control section 101, a web processing section 102, and a game management section 104.

The communication control section 101 performs processes that send and receive data to and from the terminal device 20 across the network. That is, the server device 10 performs various types of processes on the basis of information received from the terminal device 20 or the like by the communication control section 101.

The communication control section 101 performs a process to send a game screen to the terminal device 20 of a player on the basis of a request from the terminal device 20 of that player.

The web processing section 102 functions as a web server. In one example, the web processing section 102 performs a process to send data according to a request of a web browser installed on the terminal device 20 and a process to receive data sent by the web browser of the terminal device 20. These sending and receiving processes are performed via a communication protocol such as Hypertext Transfer Protocol (HTTP).

Note that the server device 10 may include a function as an SNS server, or the server device 10 may be implemented separately from a game server and an SNS server. The server device 10 may perform a portion or all of the processes of the game of the present embodiment, or the terminal device 20 may perform a portion or all of the processes of the game of the present embodiment.

The game management section 104 cooperates with the terminal device 20 to execute a game process related to a role-playing game (RPG) or a fighting game for each player, and manage the user information 146 on the basis of operations of the player input via the terminal device 20. The user information 146 includes the state of the game and the characters and various items used by each player such as item management. However, a configuration is possible in which the game management section 104 executes an automatic calculation process to automatically execute the game on the basis of various types of data set by the player, instead of on the basis of the operations of the player, generates data to be reproduced by the terminal device 20, and provides the generated data to the terminal device 20.

3. Terminal Device

Figure 3:
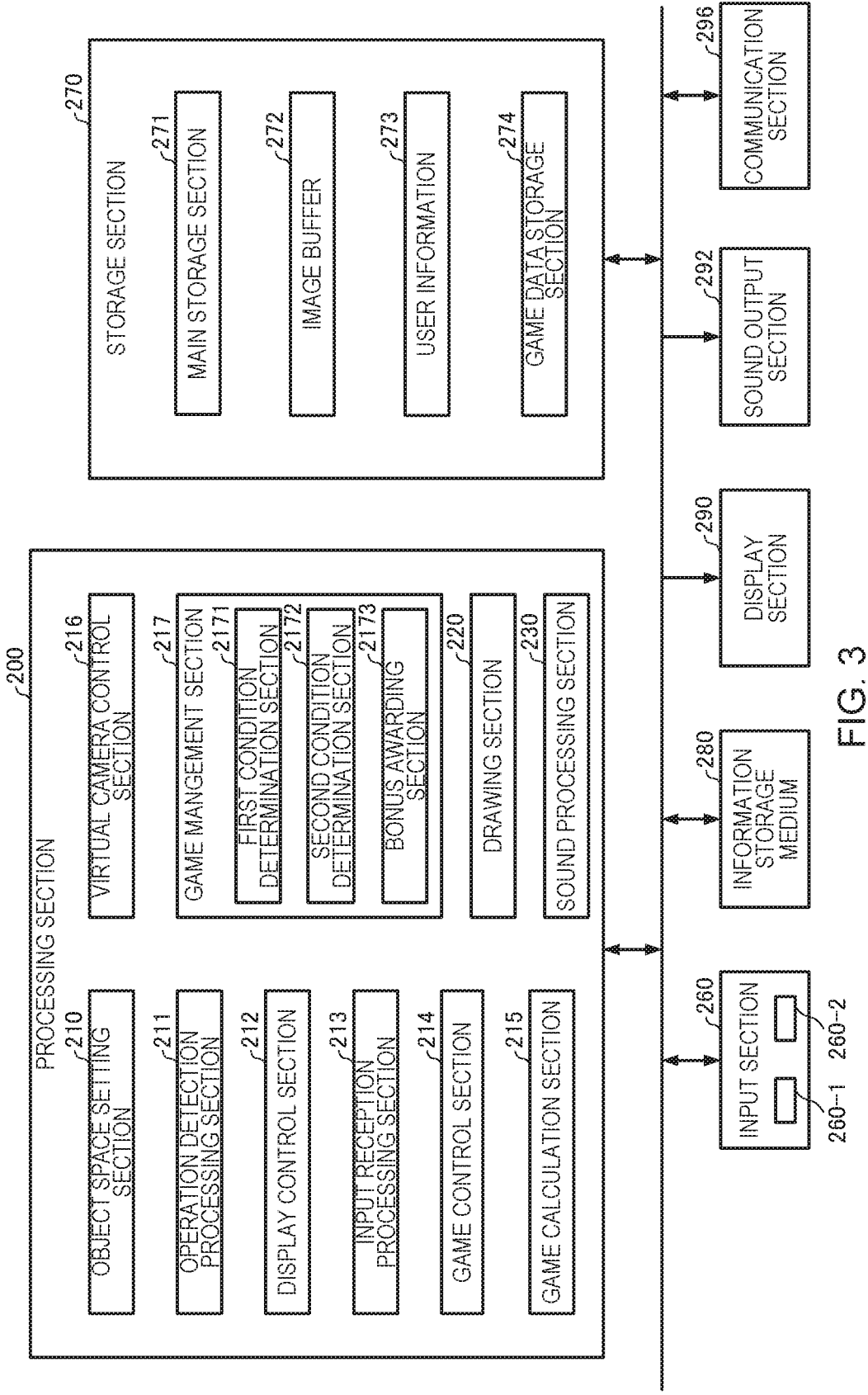
FIG. 3 is an example of a functional block diagram illustrating the configuration of a terminal device.

Next, the terminal device 20 is described while referencing FIG. 3. FIG. 3 is an example of a functional block diagram illustrating the configuration of the terminal device of the present embodiment. A portion of the constituents of FIG. 3 may be omitted.

The terminal device 20 includes an input section 260, a storage section 270, an information storage medium 280, a display section 290, a sound output section 292, a communication section 296, and a processing section 200.

The input section 260 is for the player to input operation commands to control the character. The functions of the input section 260 may be realized by a controller formed in real space and that inputs operation commands such as a cross key, a joystick, a steering wheel, a keyboard, a touch panel, or the like, or by a device formed in the real space such as a lever, a handle, a button, or a card and a field board that recognizes the position and type of the card. At least a portion of the input section 260 may be implemented as a virtual controller displayed on a display screen of a touch panel or the like. When the user performs an operation (e.g., touch operation) on the virtual controller, the input section 260 as the virtual controller generates a signal corresponding to the content of the operation by the user, and sends this signal to the processing section 200. Note that motions of the virtual controller on the touch panel are, for example, performed by a game control section 214, a display control section 212, or the like.

Moreover, the input section 260 may include an acceleration sensor, a gaze detection sensor, or the like. In particular, when the display section 290 is configured by an HMD, the input section 260 cooperates with the display section 290 and is used in a process to detect the orientation of the head and/or the gaze direction of the player and to display, on the display section 290, an image of game space based on the viewpoint of the player. Note that the first input section 260-1 and the second input section 260-2 illustrated in FIG. 3 are described later.

The storage section 270 serves as a work area for the processing section 200, the communication section 296, and the like. The functions of the storage section 270 can be implemented by RAM (VRAM) or the like. Moreover, the storage section 270 includes a main storage section 271 that is used as the work area, an image buffer 272 in which the final display images and the like are stored, user information 273 related to the provided game and representing information related to the player as a player, and a game data storage section 274 that stores various types of data (e.g., table data) required to execute the game. A configuration is possible in which a portion of the storage section 270 is omitted, and a portion of the functions of the storage section 270 may be implemented in the storage section 140 of the server device 10.

The information storage medium 280 (computer-readable medium) stores programs, data, and the like. The functions of the information storage medium 280 can be implemented by an optical disk (CD or DVD), a magneto-optical (MO) disk, a magnetic disk, a hard disk, a magnetic tape, memory (ROM), or the like. A program that causes the computer to function as each section of the present embodiment (i.e., a program that causes the computer to perform the process of each section) can be stored in the information storage medium 280. As described later, the processing section 200 performs the various processes of the present embodiment on the basis of the program (data) stored in the information storage medium 280.

The display section 290 outputs images generated by the present embodiment. The functions of the display section 290 can be implemented by a CRT, an LCD, a touch panel type display, a head-mounted display (HMD), or the like. Examples of touch panels that can be used include resistive membrane type (e.g., 4-wire type, 5-wire type), capacitance type, electromagnetic induction type, ultrasonic surface acoustic wave type, infrared scanning type, and similar touch panels.

The sound output section 292 outputs sounds generated by the present embodiment. The functions of the sound output section 292 can be implemented by a speaker, headphones, or the like.

The communication section 296 carries out various types of control to communicate with external devices (e.g., host device, other terminal devices). The functions of the communication section 196 can be implemented by hardware such as various processors or a communication ASIC, programs, and the like.

A configuration is possible in which the terminal device 20 receives, across the network, a program and data for causing the computer to function as the information storage medium of the server device 10 and/or the various sections of the present embodiment stored in the storage section 270, and stores the received program and/or data on the information storage medium 280 and/or in the storage section 270.

The processing section 200 (processor) carries out processes such as game processes, an image generation process, or a sound generation process in cooperation with the server device 10 on the basis of input data from the input section 260, a program, or the like. Examples of the game processes include a process that starts the game when a game start condition is satisfied, a process that advances the game, a process that places objects such as the player-character and the opponent-character, a process that displays an object, a process that calculates game results, and a process that ends the game when a game end condition is satisfied.

Moreover, the processing section 200 performs various processes using the storage section 270 as a work area. The functions of the processing section 200 may be implemented by hardware such as a processor (e.g., CPU or DSP) or an ASIC (e.g., gate array), and a program.

The processing section 200 includes an object space setting section 210, an operation detection processing section 211, a display control section 212, an input reception processing section 213, a game control section 214, a game calculation section 215, a virtual camera control section 216, a game management section 217, a drawing section 220, and a sound processing section 230. The game management section 217 is described in detail later. A portion of the constituents of the processing section 200 may be omitted.

The object space setting section 210 performs a process of placing an object (e.g., player-character, moving object, opponent-character), and a variety of objects (i.e., an object formed by a primitive surface such as a sprite, a billboard, polygon, a free-form surface, or a subdivision surface) representing display objects such as a moving path, a building, a tree, a pillar, a wall, and a map (terrain) in an object space. Specifically, the object space setting section 210 determines the position and the rotational angle (synonymous with orientation or direction) of the object (model object), and places the object at the determined position ((X, Y) or (X, Y, Z)) and the determined rotational angle ((rotational angles around X and Y-axes) or (rotational angles around X, Y, and Z-axes)).

In this case, the object space includes both so-called virtual two-dimensional space and virtual three-dimensional space. Two-dimensional space is space in which the object is placed at two-dimensional coordinates (e.g., X, Y), and three-dimensional space is space in which the object is placed at three-dimensional coordinates (e.g., X, Y, Z).

When the object space is two-dimensional space, the plurality of objects are placed on the basis of priority order set for each of the objects. In one example, a process can be carried out in which, first, the objects that are to be seen in the back (sprites) are placed, and then the objects that are to be seen in front are overlaid.

By placing the objects with large drawing sizes in the lower portion of the image and placing the objects with small drawing sizes in the upper portion of the image, the object space corresponding to the upper portion of the screen can be made to appear as if distant and the object space corresponding to the lower portion of the screen can be made to appear as if close.

When the object space is three-dimensional space, the objects are placed in a world coordinate system.

The operation detection processing section 211 performs a recognition process for the input information input by the player via the input section 260. Specifically, the operation detection processing section 211 receives a command for each character of the player, input via the input section 260.

The display control section 212 displays, on the display section 290, content related to the game executed on the basis of a command of the player. In one example, the display control section 212 displays three-dimensional game space, two-dimensional game space, or the like on the display section 290. For example, at game start, during the game, and at game end, the display control section 212 displays, on the display section 290, various types of content such as a menu for carrying out a given setting related to the game.

The input reception processing section 213 receives input commands that are input by the player via the input section 260, and sends the received input commands to the game control section 214 or the like.

The game control section 214 performs a game process based on the commands received by the input reception processing section 213. In one example, the game control section 214 executes control over a control target character (i.e., player-character) related to the command (i.e., input command) received by the input reception processing section 213, or control over the opponent-character or other accompanying character. For example, in a fighting game or a shooting game, the game control section 214 performs a predetermined process such as an attack on the opponent-character or support (e.g., ability recovery) of an ally character. In a simulation game, the game control section 214 executes a predetermined task such as the creation of crops or building construction. Moreover, the game control section 214 performs movement calculations of moving objects (in particular, character objects such as the player-character and the opponent-character) in the object space.

Specifically, the game control section 214 performs a process for causing the moving objects (including the characters) to move in the movement space or for controlling the motions (animations) of the moving objects on the basis of the input data input by the player via the input section 260, a program (movement algorithm), various types of data (motion data), and the like.

For example, the game control section 214 performs a simulation process that sequentially calculates movement information (e.g., moving direction, movement amount, moving speed, position, or acceleration) and motion information (e.g., the position or the rotational angle of each part object) about each object every frame. Note that the term "frame" refers to a time unit used when the object movement process, the object motion process (simulation process), and the image generation process are performed. Here, the frame rate may be fixed, or may be variable according to the processing load.

The game control section 214 may perform a process that moves an object in the three-dimensional object space on the basis of an input direction. For example, a moving direction is associated with each input direction, and the object is moved in the moving direction associated with the input direction The game control section 214 may cooperate with the server device 10 to execute the various processes, or a portion or all of the functions of the game control section 214 may be assigned to the server device 10 side.

The game calculation section 215 performs a variety of game calculation processes. For example, in a case in which a plurality of player-characters to be used in the game on the basis of commands of the player are set as a deck (deck data), the game calculation section 215 executes various processes that advance the game using each player-character set in the deck. For example, the game calculation section 215 performs calculation processes required to execute the game such as the formation of a predetermined object space of a shooting game, the formation an object space based on a map, the advancement of a game based on a preset scenario according to the operations of the player, a fight between the player-character (controlled character) and the opponent-character or other object (non-controlled character), and parameter management during the fight.

The game calculation section 215 may cooperate with the server device 10 to perform the various processes, or a portion or all of the functions of the game calculation section 215 may be assigned to the server device 10 side.

The virtual camera control section 216 generates images of the object space viewed from a given viewpoint, and the images appear to have depth. In this case, the virtual camera control section 216 performs a control process of the virtual camera (viewpoint) that generates images viewed from the given (arbitrary) viewpoint within the object space. Specifically, the virtual camera control section 216 performs a process (process of controlling viewpoint position and/or gaze direction) that controls the position (X, Y, Z) or the rotational angle (rotational angles around X, Y, and Z-axes).

For example, in a case in which an object (e.g., a character, a ball, or a vehicle) is imaged from the back by the virtual camera, the virtual camera control section 216 controls the position and the rotational angle (orientation of the virtual camera) so that the virtual camera follows changes in the position or the rotation of the object.

In this case, the virtual camera can be controlled on the basis of information obtained by the game control section 214, such as the position, the rotational angle, or the speed of the object. Alternatively, the virtual camera may be controlled to rotate at a predetermined rotational angle or move along a predetermined moving path. In this case, the virtual camera control section 216 controls the virtual camera on the basis of virtual camera data for identifying the position (moving path) or rotational angle of the virtual camera.

Note that, when there are a plurality of virtual cameras (viewpoints), the control processes described above are performed for each virtual camera.

On the basis of operations of the player input via the input section 260, the game management section 217 sets the player-character and various types of items to be used by each player in the game (e.g., fighting game), and registers these settings in the user information 273 and the game data storage section 274.

For example, in a case in which the game is advanced using a deck, the game management section 217 registers the set player-characters and various types of items as the deck data in the user information 273.

Note that, as appropriate, the game management section 217 may function as a first condition determination section 2171 (example of the first condition determination means), a second condition determination section 2172 (example of the second condition determination means), and a bonus awarding section 2173 (example of the bonus awarding means). The first condition determination section 2171, the second condition determination section 2172, and the bonus awarding section 2173 are described later in detail.

The drawing section 220 performs a drawing process on the basis of the results of various processes (game process) performed by the processing section 200 to generate images, and outputs the generated images to the display section 290. The images generated by the drawing section 220 may be so-called 2D images or so-called 3D images. In particular, the drawing section 220 generates an image of the object space as viewed from the virtual camera, and the image is to be displayed on a screen.

When a 2D image is generated, the drawing section 220 first draws the objects that have low priority and, when objects overlap, the objects that have high priority are drawn over the objects that have low priority.

When a 3D image is generated, first, object data (model data) that includes vertex data (e.g., vertex position coordinates, texture coordinates, color data, normal vector, or alpha value) with respect to each vertex of the object (model) is input into the drawing section 220, and a vertex process is performed on the basis of the vertex data included in the input object data. The drawing section 220 may optionally perform a vertex generation process (tessellation, curved surface division, or polygon division) for subdividing the polygon when performing the vertex process.

Additionally, in the vertex process, the drawing section 220 performs a vertex movement process and a geometric process such as a coordinate transformation process (world coordinate transformation process and camera coordinate transformation process), a clipping process, a perspective transformation process, or a light source process, and changes (updates or adjusts) the vertex data with respect to each vertex of the object on the basis of the processing results. Moreover, the drawing section 220 performs a rasterization process (scan conversion process) on the basis of the vertex data subjected to the vertex process to link the surface of the polygon (primitive) to pixels. The drawing section 220 then performs a pixel process (i.e., a fragment process) that draws the pixels that form the image (fragments that form the display screen).

The drawing section 220 implements the pixel process by determining the final drawing color of each pixel that forms the image by performing various processes such as a texture readout (texture mapping) process, a color data setting/change process, a translucent blending process, and an anti-aliasing process, and outputting (drawing) the drawing color of the object subjected to a perspective transformation process to the image buffer 272 (i.e., a buffer that can store image information on a pixel basis (VRAM or rendering target)). Specifically, the drawing section 220 implements the pixel process by performing a per-pixel process that sets or changes the image information (e.g., color, normal, luminance, and alpha-value) on a pixel basis.

The drawing section 220 thus generates an image viewed from the virtual camera (given viewpoint) set in the object space. Note that, where there are a plurality of virtual cameras (viewpoints), it is possible to generate an image such that the images viewed from each of the virtual cameras are displayed on a single screen as split images.

The vertex process and the pixel process may be implemented by hardware that enables a programmable polygon (primitive) drawing process (i.e., a programmable shader (vertex shader and pixel shader)) based on a shader program written in shading language. The programmable shader enables a programmable per-vertex process and a programmable per-pixel process to increase the degree of freedom with respect to the drawing process so that the representation capability can be significantly improved as compared with a fixed drawing process using hardware.

Moreover, the drawing section 220 performs a geometric process, a texture mapping process, a hidden surface removal process, an alpha-blending process, and the like when drawing the object.

The drawing section 220 implements the geometric process by performing a coordinate transformation process, a clipping process, a perspective projection transformation process, a light source calculation process, and the like on the object. The drawing section 220 stores the object data (e.g., object's vertex position coordinates, texture coordinates, color data (brightness data), normal vector, or alpha-value) subjected to the geometric process (perspective transformation process) in the storage section 270.

The drawing section 220 performs a process that maps, onto the object, a texture (texel value) stored in a texture storage section of the storage section 270. Specifically, the drawing section 220 reads a texture (surface properties such as color (RGB) and alpha-value) from the texture storage section of the storage section 270 using the texture coordinates set (assigned) to the vertices of the object, and the like, and maps the 2D image (i.e., texture) onto the object. In this case, the drawing section 220 performs a pixel-texel link process, a bilinear interpolation process (texel interpolation process), and the like.

Note that, in the present embodiment, the drawing section 200 may perform a process that maps a given texture when drawing the object. In this case, the mapped color distribution (texel pattern) can be dynamically changed.

A configuration is possible in which textures with different color distributions (pixel patterns) are dynamically generated. Alternatively, a configuration is possible in which a plurality of textures with different color distributions are prepared in advance, and the texture to be used is dynamically switched. Additionally, the color distribution of the texture may be changed on an object basis.

The drawing section 220 implements the hidden surface removal process using a Z-buffer method (depth comparison method or Z-test) that utilizes a Z-buffer (depth buffer) that stores the Z-value (depth information) of the drawing pixel. Specifically, when drawing the drawing pixels linked to the primitive of the object, the drawing section 220 references the Z-value stored in the Z-buffer and compares that Z-value stored in the Z-buffer with the Z-value of the drawing pixel of the primitive. When the Z-value of the drawing pixel is the Z-value in front of the virtual camera (e.g., a small Z-value), the drawing section 220 draws the drawing pixel, and updates the Z-value stored in the Z-buffer with a new Z-value.

Then, the drawing section 220 implements the alpha-blending (alpha-synthesis) by performing a translucent blending process (e.g., normal alpha-blending process, additive alpha-blending process, or subtractive alpha-blending process) based on the alpha-value (A value). Note that the alpha-value is information that can be stored so as to be linked to each pixel (texel or dot), such as additional information other than the color information. The alpha-value can be used as mask information, translucency (equivalent to transparency or opacity), bump information, or the like.

The sound generation section 230 performs a sound process on the basis of the results of various processes performed by the processing section 200 to generate a game sound (e.g., background music (BGM), effect sound, or voice), and outputs the generated game sound to the sound output section 292.

Note that the terminal device of the present embodiment may be configured as a single-player-mode-only system on which only one player can play, or may be configured as a system with a multi-player-mode on which a plurality of players can play.

In a case in which a plurality of players play, the game images and game sounds provided to these players may be generated utilizing one terminal device 20, or may be generated through distributed processing utilizing the server device 10 or a plurality of terminal devices 20 connected by a network (e.g., transmission line, communication line).

4. Method

4-1. Outline of Fighting Game

In the present embodiment, an example is described in which the terminal device 20 is a home game system. In one example, the processing section 200 of the terminal device 20 (example of the information processing device) executes a fighting game according to the programs stored in the information storage medium 280. This fighting game is a game in which, basically, two characters fight. Herein, the two characters involved in the fight are defined as a first player-character A and a second player-character E (see FIG. 7A, described later). The player controlling the first player-character A is defined as the first player, and the player controlling the second player-character E is defined as the second player.

The game management section 217 of the processing section 200 ends the fighting game at the point in time, prior the passage of a predetermined time (e.g., 100 seconds) from the start of the fighting game, at which a stamina parameter of the first player-character A or a stamina parameter of the second player-character E reaches zero. The game management section 217 determines the character, among the first player-character A and the second player-character E, for which the stamina parameter remains as the winner and determines the character for which the stamina parameter is zero as the loser.

However, in a case in which the stamina parameters of both the first player-character A and the second player-character E remain when the predetermined time (e.g., 100 seconds) from the start of the game has passed, the game management section 217 determines the player-character for which the remaining stamina parameter is greater as the winner and determines the player-character for which the remaining stamina parameter is smaller as the loser.

4-2. Hardware Configuration Related to the Fighting Game

To implement the fighting game, as illustrated in FIG. 3, the input section 260 of the terminal device 20 is provided with a first input section 260-1 and a second input section 260-2. The first input section 260-1 is mainly used when the first player inputs operation commands related to the actions of the first player-character A into the terminal device 20, and the second input section 260-2 is mainly used when the second player inputs operation commands related to the actions of the second player-character E into the terminal device 20.

It is possible to utilize a non-mounted display (e.g., projector) that is visible simultaneously by the first player and the second player as the display section 290 of the terminal device 20. However, the first player and the second player can also use separate displays as the display section 290. In one example, the display section 290 may be implemented as a combination of a portable display (e.g., a portable display that also serves as the input unit) used by the first player and a portable display (e.g., a portable display that also serves as the input unit) used by the second player. Alternatively, the display section 290 may be implemented as a combination of an HMD worn by the first player and an HMD worn by the second player. Hereinafter, an example of a case is described in which a single display section 290 is shared by the first player and the second player.

4-3. Fundamental Processing Related to the Fighting Game

Figure 7A:
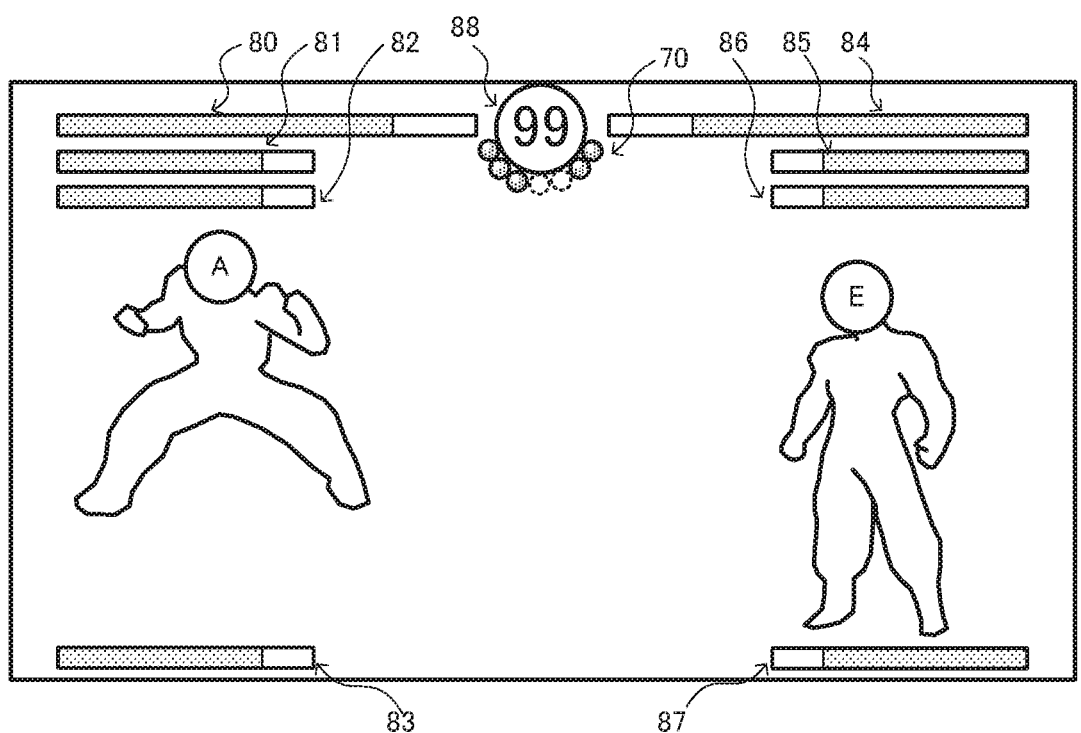
FIG. 7A is an example of a drawing explaining a fight screen.

The object space setting section 210 of the processing section 200 performs a process that places the first player-character A and the second player-character E that are involved in the fight in the object space (virtual space). The fight screen illustrated in FIG. 7 depicts the object space in which the first player-character A and the second player-character E exist. Note that, in FIG. 7A, the head of the first player-character A is marked with "A" and the head of the second player-character E is marked with "E" to distinguish between the first player-character A and the second player-character E. However, in an actual fight screen, the two characters may be distinguished by a combination of the faces, hairstyles, clothing, and body shapes of the characters.

The input reception processing section 213 of the processing section 200 receives operation commands from the first player via the input section 260-1 and also receives operation commands from the second player via the input section 260-2. As described above, the operation commands input from the input section 260-1 are mainly commands related to the actions of the first player-character A, and the operation commands input from the input section 260-2 are mainly commands related to the actions of the second player-character E.

The game control section 214 of the processing section 200 controls the actions of the first player-character A in the object space on the basis of the operation commands input by the first player, and controls the actions of the second player-character E in the object space on the basis of the operation commands input by the second player. Each of the actions of the first player-character A and the second player-character E includes a fighting action. Examples of the fighting actions (skills) include attack actions such as punches and kicks, defensive actions such as jumps and squats, and movement actions such as shifting the body frontward, backward, to the left, or to the right. Skills (e.g., special lethal skills, lethal skills, normal skills) are also included in the attack actions that the player-characters can use. Lethal skills are special attack actions that are predetermined by character according to the attributes and the like of that character.

The display control section 212 of the processing section 200 displays, on the display section 290, an image (video) of the object space in which the first player-character A and the second player-character E act (FIG. 7A). Moreover, the display control section 212 overlays and displays, on the display section 290, gauges that indicate, in real time, the various parameters of the first player-character A (e.g., stamina gauge reflecting the stamina parameter of the first player-character A, and skill gauge reflecting the skill parameter of the first player-character A), gauges that indicate, in real time, the various parameters of the second player-character E (e.g., stamina gauge reflecting the stamina parameter of the second player-character E, and skill gauge reflecting the skill parameter of the second player-character E), and various types of images (reference numerals 70, 80 to 88) indicating the state of the fighting game (FIG. 7A). Note that, reference numerals 80 to 87 in FIG. 7A are gauges that indicate the various parameters, reference numeral 70 is an acquisition gauge indicating the number of special items acquired, and reference numeral 88 is a numerical image that depicts the countdown of the time remaining until the end of the fight. In one example, reference numerals 80 and 84 are images of stamina gauges, and reference numerals 83 and 87 are images of skill gauges.

The game management section 217 of the processing section 200 manages the parameters of the first player-character A and the second player-character E on a player basis, and preforms various determination processes and the like on the basis of the parameters by character. Note that the stamina parameter, the skill parameter, and the like are included in the parameters by character (FIG. 5).

4-4. Data Stored in the Storage Section

FIG. 4 is an example of a drawing explaining the user information 273 registered in the terminal device. The user information is registration information associated with each of a plurality of users (including the first player and the second player) that are registered as users in the terminal device 20. The user information is stored in the storage section 270. As illustrated in FIG. 4, user registration information, available characters, fighting game levels, and the like are stored by user ID in the user information. Note that the registration information may be collectively managed by the server device 10.

FIG. 5 is an example of a drawing explaining game data related to the fighting game. The game data is information related to the two player-characters that fight in the fighting game (in this case, the first player-character A and the second player-character E). The game data is stored in the game data storage section 274. As illustrated in FIG. 5, the game data includes information for identifying the two player-characters (in this case, the first player-character A and the second player-character E), the various parameters (e.g., the stamina parameter, the skill parameter, a combo count by specific skill) of the two player-characters (in this case, the first player-character A and the second player-character E), item inventories of the two player-characters (in this case, the first player-character A and the second player-character E), and the numbers of acquired special items of the two player-characters (in this case, the first player-character A and the second player-character E). These data are stored in the game data by user ID of the player (first player and second player) that controls the character.

The stamina parameters of the player-characters decrease when a player-character receives damage from an attack by the fight opponent. The stamina parameters of the player-characters recover with the passage of time. The stamina parameters of the player-characters can also be recovered by consuming a recovery item possessed by the player-character.

The skill parameters of the player-characters are consumed as a result of the player-characters using (activating) lethal skills. The skill parameters of the player-characters recover with the passage of time. Note that the relationship between the actions and the skill parameters of the player-characters may be set to one or more of the following:

(1) The skill parameter of the player-character increases when the player-character activates a skill (e.g., normal skill, lethal skill) other than a special lethal skill;

(2) The skill parameter of the player-character increases when the player-character lands an attack on the opponent-character;

(3) The skill parameter of the player-character increases when the player-character is attacked by the opponent-character;

(4) The skill parameter of the player-character increases a small amount when the player-character activates the skill corresponding to (1) and, the skill parameter of the player-character increases even more if the attack of (2) hits the opponent-character;

(5) The skill parameter of the player-character decreases when the player-character activates a special lethal skill (e.g., a special lethal skill that consumes a small amount of the skill gauge, or a super lethal skill that consumes a large amount of the skill gauge);

(6) The skill parameter of the player-character decreases when the player-character activates a special defense skill (e.g., a special defense activated during an opponent's combo attack that interrupts the combo); and (7) The skill parameter of the player-character decreases when the player-character is provoked by the opponent-character.

In FIG. 5, the "combo count by special skill" is the number of consecutive successful attacks resulting from one type or a plurality of types of specific skills by the player-character. The term "successful" means that damage was inflicted on the opponent character. The term "consecutive" means successful attacks are repeated within a time limit, and can also be paraphrased as "combo." For example, for a player to earn a combo count, the player must input operation commands in a predetermined pattern within a time limit during a period in which the opponent character is unable to act (e.g., during tired motion). The term "combo attack" is used to refer to consecutive attacks resulting from a skill (e.g., a normal skill or a lethal skill). The term "N-combo attack" refers to a combo attack with a combo count of N.

Note that, the combo count "N" of an N-combo attack is determined when the continuation of successful attacks is interrupted, specifically, when a subsequent successful attack is not detected after a final combo attack within the time limit. Therefore, when, for example, the combo count is 70 at the point in time at which the combo is interrupted, the combo count is determined to be 70 and is not a value less than 70 (e.g., 69, 68, 67, or the like).

FIG. 6 is an example of a drawing explaining a character table related to the fighting game. The character table is a table that defines specific skills by character, attributes by character, and the like. The character table is stored in the game data storage section 274. Types of specific skills, character attributes, and the like are stored in the character table by character.

The term "specific skills" refers to one or a plurality of types of specific skills (techniques) required to acquire a special item. As illustrated in FIG. 6, in the present embodiment, specific skills are determined by character, and two or more specific skills are set for each character. In the example illustrated in FIG. 6, the specific skills of the player-character A are defined as "high kick, leg sweep . . . ", and the specific skills of player-character B are defined as "punch, elbow strike . . . ".

4-5. Processing Related to Wish Event

A wish event that occurs during the fighting game is described below. The "wish event" is an event awarded to a player upon fulfillment of a first condition and a second condition (described layer), and is an opportunity for the player to obtain a bonus. In this case, a fight in which the first player-character A controlled by the first player is considered. The first player-character A is simply called the "player-character A" and the fight opponent of player-character A (i.e., the second player-character E) is called the "opponent-character E." Fundamentally, the descriptions of the player-character A and the first player controlling the player-character A can be applied to the opponent-character E and the second player controlling the opponent-character E.

The terminal device 20 of the present embodiment performs the processes of the fighting game in which the player-character A is made to fight the opponent-character E. The game management section 217 of the terminal device 20 appropriately operates as the first condition determination section 2171, the second condition determination section 2172, and the bonus awarding section 2173.

The first condition determination section 2171 determines whether the player-character A and the opponent-character E have, as a whole, fulfilled the first condition during the fight. The second condition determination section 2172 determines the character, among the player-character A and the opponent-character E, that fulfills the second condition during the fight. The bonus awarding section 2173 awards a bonus that can be used in the fight to a fulfilling character, among the player-character A and the opponent-character E, that fulfills the second condition after fulfillment of the first condition.

Accordingly, with the terminal device 20, when (i) the player-character A fulfills the first condition, (ii) the opponent-character E fulfills the first condition, or (iii) the player-character A and the opponent-character E cooperate to fulfill the first condition, a bonus is awarded to the fulfilling character, among the player-character A and the opponent-character E, that fulfills the second condition. That is, regardless of the degree of contribution toward the fulfillment of the first condition, the fulfilling character that fulfills the second condition can receive a bonus award. As such, an intense situation can be created during the period from the fulfillment of the first condition until the fulfillment of the second condition, in which the recipient of the bonus award is undecided.

4-5-1. Processing of the First Condition Determination Section

The processing of the first condition determination section 2171 is described in detail below.

An example is described in which the "acquisition of all seven special items" is set as the first condition, and successful attacks using the specific skills of the player-character A must be continuous (i.e., a combo attack must be performed) for the player-character A to acquire a special item. Each of the seven special items is managed by a unique item ID, and only one of each of the special items can exist in the object space (only one of each of the special items can be acquired during a fight). Information for specifying the first condition is stored in advance in the storage section 270 as a portion of the program, or is stored in advance separate from the program in the game data storage section 274 or the like. Information indicating the specific skills of the player-character A is stored in advance in the character table (FIG. 6). The first condition determination section 2171 performs the following processes (1) to (11) on the basis of these pieces of information. The timings at which the processes (1) to (11) are performed are after the start of the fighting game, either periodically or each time an event occurs.

(1) The first condition determination section 2171 determines whether the player-character A has successfully performed a combo attack, using the specific skills of player-character A, of any of 10 to 19 hits. When a combo attack of any of 10 to 19 hits is successfully performed, the first condition determination section 2171 awards a first special item to the player-character A by adding the first special item to the items possessed by the player-character A (FIG. 5). However, the first condition determination section 2171 does not perform the process that adds the first special item when, at the time of successfully performing the combo attack, the first special item is already included in the items of the player-character A or the opponent-character E.

(2) The first condition determination section 2171 determines whether the player-character A has successfully performed a combo attack, using the specific skills of player-character A, of any of 20 to 29 hits. When a combo attack of any of 20 to 29 hits is successfully performed, the first condition determination section 2171 awards a second special item to the player-character A by adding the second special item to the items possessed by the player-character A. However, the first condition determination section 2171 does not perform the process that adds the second special item when, at the time of successfully performing the combo attack, the second special item is already included in the items of the player-character A or the opponent-character E.

(3) The first condition determination section 2171 determines whether the player-character A has successfully performed a combo attack, using the specific skills of player-character A, of any of 30 to 39 hits. When a combo attack of any of 30 to 39 hits is successfully performed, the first condition determination section 2171 awards a third special item to the player-character A by adding the third special item to the items possessed by the player-character A. However, the first condition determination section 2171 does not perform the process that adds the third special item when, at the time of successfully performing the combo attack, the third special item is already included in the items of the player-character A or the opponent-character E.

(4) The first condition determination section 2171 determines whether the player-character A has successfully performed a combo attack, using the specific skills of player-character A, of any of 40 to 49 hits. When a combo attack of any of 40 to 49 hits is successfully performed, the first condition determination section 2171 awards a fourth special item to the player-character A by adding the fourth special item to the items possessed by the player-character A. However, the first condition determination section 2171 does not perform the process that adds the fourth special item when, at the time of successfully performing the combo attack, the fourth special item is already included in the items of the player-character A or the opponent-character E.

(5) The first condition determination section 2171 determines whether the player-character A has successfully performed a combo attack, using the specific skills of player-character A, of any of 50 to 59 hits. When a combo attack of any of 50 to 59 hits is successfully performed, the first condition determination section 2171 awards a fifth special item to the player-character A by adding the fifth special item to the items possessed by the player-character A. However, the first condition determination section 2171 does not perform the process that adds the fifth special item when, at the time of successfully performing the combo attack, the fifth special item is already included in the items of the player-character A or the opponent-character E.

(6) The first condition determination section 2171 determines whether the player-character A has successfully performed a combo attack, using the specific skills of player-character A, of any of 60 to 69 hits. When a combo attack of any of 60 to 69 hits is successfully performed, the first condition determination section 2171 awards a sixth special item to the player-character A by adding the sixth special item to the items possessed by the player-character A. However, the first condition determination section 2171 does not perform the process that adds the sixth special item when, at the time of successfully performing the combo attack, the sixth special item is already included in the items of the player-character A or the opponent-character E.

(7) The first condition determination section 2171 determines whether the player-character A has successfully performed a combo attack, using the specific skills of player-character A, of any of 70 to 79 hits. When a combo attack of any of 70 to 79 hits is successfully performed, the first condition determination section 2171 awards a seventh special item to the player-character A by adding the seventh special item to the items possessed by the player-character A (FIG. 5). However, the first condition determination section 2171 does not perform the process that adds the seventh special item when, at the time of successfully performing the combo attack, the seventh special item is already included in the items of the player-character A or the opponent-character E.

(8) The first condition determination section 2171 calculates the special item acquisition count of the player-character A and writes the calculated result to the game data (FIG. 5) of the player-character A.

(9) The first condition determination section 2171 performs the processes (1) to (8) related to the player-character A for the player-character E in the same manner.

(10) The first condition determination section 2171 calculates the sum of the number of special items acquired (FIG. 5) by the player-character A and the number of special items acquired (FIG. 5) by the player-character E as the number of special items acquired as a whole by the player-character A and the player-character E.

(11) The first condition determination section 2171 determines whether the number of special items acquired as a whole by the player-character A and the opponent-character E has reached "7" and, when "7" has been reached, regards that the first condition (acquisition of all seven of the special items) has been fulfilled.

4-5-2. Processing of the Second Condition Determination Section

The processing of the second condition determination section 2172 is described in detail below.

An example is described in which "recovery of the skill parameter" is set as the second condition. Information for specifying the second condition is stored in advance in the storage section 270 as a portion of the program, or is stored in advance separate from the program in the game data storage section 274 or the like. The second condition determination section 2172 performs the following processes (1) to (4) on the basis of this information. The timings at which the processes (1) to (4) are performed are after the start of the fighting game, either periodically or each time an event occurs. However, the execution period of process (4) may be set to only after the fulfillment of the first condition.

(1) The second condition determination section 2172 determines whether the player-character A has received damage from an attack by the opponent-character E and, when damage has been received, performs a process that subtracts a value corresponding to the damage from the stamina parameter of the player-character (FIG. 5). Additionally, the second condition determination section 2172 optionally performs a process that decreases the skill parameter of the player-character (FIG. 5) on the basis of the actions of the player-character A and the opponent-character E. The skill parameter is decreased in the manner described in the example above.

(2) The second condition determination section 2172 performs a process that recovers the stamina parameter of the player-character A (FIG. 5) with the passage of time. Additionally, the second condition determination section 2172 optionally performs a process that recovers the skill parameter of the player-character (FIG. 5) on the basis of the actions of the player-character A and the opponent-character E. The skill parameter is recovered (added) in the manner described in the example above.

(3) The second condition determination section 2172 performs the processes (1) to (2) related to the player-character A for the player-character E as well in the same manner.

(4) The second condition determination section 2172 monitors the individual skill parameters of the player-character A and the opponent-character E and determines whether the skill parameter of either one of the characters has recovered to the maximum value. The second condition determination section 2172 regards the character whose skill parameter has recovered to the maximum value as the character that has fulfilled the second condition.

4-5-3. Processing of the Bonus Awarding Section

The processing of the bonus awarding section 2173 is described in detail below.

The bonus awarding section 2173 identifies the character (among the player-character A and the opponent-character E) whose skill parameter recovers first to the maximum value after the fulfillment of the first condition (the acquisition of all seven special items) as a fulfilling character, and awards a bonus to the fulfilling character, but does not award a bonus to the other character.

For example, in a case in which the bonus to be awarded to the fulfilling character is "full recovery of stamina," the bonus awarding section 2173 recovers the stamina parameter in the game data (FIG. 5) of the fulfilling character to the maximum value.

In a case in which the bonus to be awarded to the fulfilling character is "make immortal," the bonus awarding section 2173 sets the recovery speed of the stamina parameter in the game data of the fulfilling character to the fastest speed. Here, an example is described in which, when the stamina parameter decreases to a certain range, the stamina parameter is in a recoverable state (i.e., red stamina). Characters for which the recovery speed from red stamina is fast immediately recover stamina when placed in a moribund state. As such, such characters (immortal characters) are extremely difficult for the opponent character to defeat.

In a case in which the bonus to be awarded to the fulfilling character is "grant ultimate power," the bonus awarding section 2173 raises the attack power parameter (not illustrated in the drawings) of the fulfilling character to the maximum value (the maximum value may be exceeded as well). The attack power parameter is stored, for example, in the game data storage section 274.

In a case in which the bonus to be awarded to the fulfilling character is "revive a friend," the bonus awarding section 2173 recovers the stamina parameter of a character registered in advance in the deck data (not illustrated in the drawings) of the player (fulfilling player) controlling the fulfilling character. Here, an example is described in which the fulfilling player has registered a plurality of characters in the deck data of the fulfilling player prior to the fighting game, and the plurality of characters are sequentially put into the fight. The deck data is stored, for example, in the game data storage section 274.

4-6. First Condition

As described above, the first condition determination section 2171 sets the fulfillment of a given set of conditions as the first condition. Each condition of the given set of conditions is the acquisition of one special item. In this case, each condition (acquisition of one of the special items) of the set of conditions must be fulfilled in order to fulfill the first condition (acquisition of all seven of the special items) and, as such, a given cost (time and effort) is required for the fulfillment of the first condition (acquisition of all seven of the special items).

Accordingly, when the player-character A contributes to the fulfillment of the first condition (acquisition of all seven of the special items) but does not achieve fulfillment of the second condition (recovery of the skill parameter), the loss feeling (feeling of loss) of the first player can be increased, and when the player-character A does not contribute to the fulfillment of the first condition (acquisition of all seven of the special items) but achieves fulfillment of the second condition (recovery of the skill parameter), the advantage feeling (feeling of advantage) of the first player can be increased.

Likewise, when the opponent-character E contributes to the fulfillment of the first condition (acquisition of all seven of the special items) but does not achieve fulfillment of the second condition (recovery of the skill parameter), the loss feeling (feeling of loss) of the second player can be increased, and when the opponent-character E does not contribute to the fulfillment of the first condition (acquisition of all seven of the special items) but achieves fulfillment of the second condition (recovery of the skill parameter), the advantage feeling (feeling of advantage) of the second player can be increased.

4-7. Acquisition Gauge

The first condition determination section 2171 presents whether the first condition is fulfilled or a degree of fulfillment of the first condition to the first player and the second player. In this case, the both the first player controlling the player-character A and the second player controlling the opponent-character E can understand whether the first condition (acquisition of all seven of the special items) is fulfilled, or the degree of fulfillment (number of special items acquired) of the first condition. As such, the first player and the second player can individually strategically determine the actions of their own characters required to acquire a bonus (i.e., for the fulfillment of the second condition).

For example, the first player and the second player can each consecutively confirm whether the first condition has been fulfilled or the degree of fulfillment of the first condition and cause their player-character to strategically act with the purpose of "ensuring that more of the skill parameter of their own player-character remains than the skill parameter of the opponent character when the first condition has been fulfilled", "attempting to fulfill the first condition while reserving the skill parameter", "attempting to exhaust the stamina of the opponent character before the first condition is fulfilled", or the like in order to ensure that their own player-character fulfills the second condition.

FIG. 7A is an example of a drawing explaining a fight screen. The fight screen is displayed on the display section 290 at least during the period from after the start of the fighting game to the end of the fighting game.

The object space in which the player-character A and the opponent-character E act is depicted in the fight screen. As illustrated in FIG. 7A, in one example, the standing position of the player-character A in the fight screen is on the left or right side (the left side in this case), and the standing position of the opponent-character E in the fight screen is on the other of the left and right sides (the right side in this case).

The first condition determination section 2171 cooperates with the display control section 212 and overlays and displays, on the fight screen, an acquisition gauge 70 representing whether the first condition (acquisition of all seven of the special items) is fulfilled or the degree of fulfillment (number of special items acquired) of the first condition. In one example, the overlay position of the acquisition gauge 70 in the fight screen (FIG. 7A) is between the standing position of the player-character A and the standing position of the opponent-character E (e.g., the upper center portion of the fight screen).

The acquisition gauge 70 is an image that expresses whether the first condition (acquisition of all seven of the special items) is fulfilled or the degree of fulfillment of the first condition by the player-character A and the opponent-character E as a whole. In the example illustrated in FIG. 7A, the acquisition gauge 70 has a partial ring-shaped region in which a total of seven sphere-shape marks can be arranged. A number of sphere-shaped marks corresponding to the number of special items currently acquired is arranged in the partial ring-shaped region. Five sphere-shaped marks are arranged (lit) in the partial ring-shaped region of the acquisition gauge 70 in FIG. 7A. Therefore, it is clear that the number of special items currently acquired is "5."

The first condition determination section 2171 calculates the special item acquisition count of the player-character A and the player-character E as a whole periodically or each time the player-character A or the player-character E acquires a special item. The first condition determination section 2171 cooperates with the display control section 212 to consecutively reflect the number of acquired special items in the image of the acquisition gauge 70.

Figure 7B:
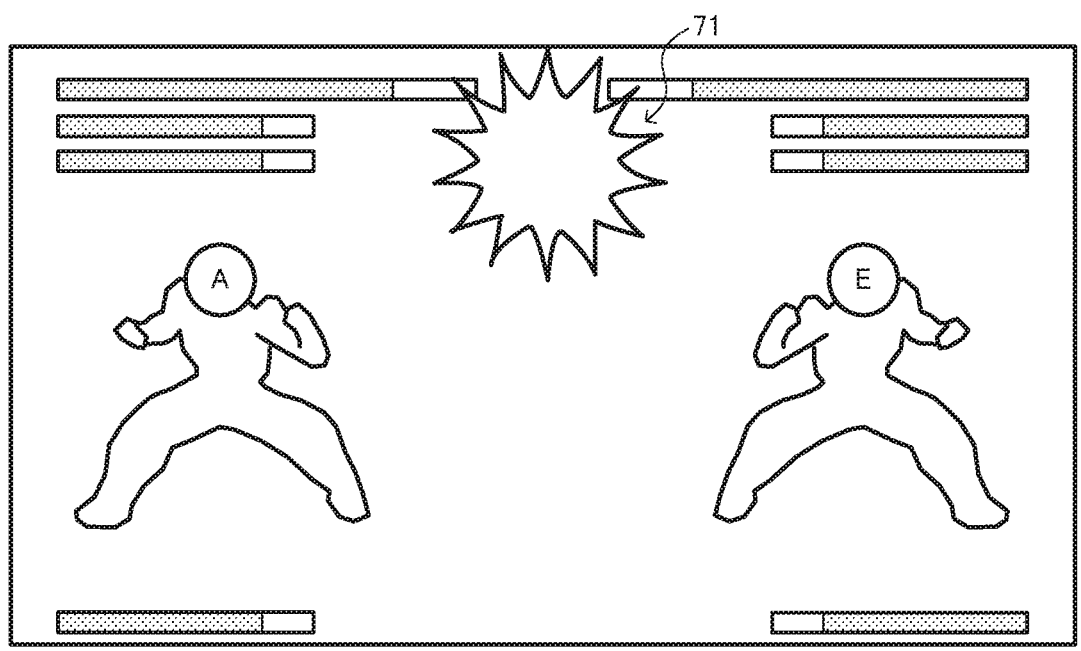
FIG. 7B is an example of a drawing explaining a fight screen when a first condition is fulfilled.
Figure 7C:
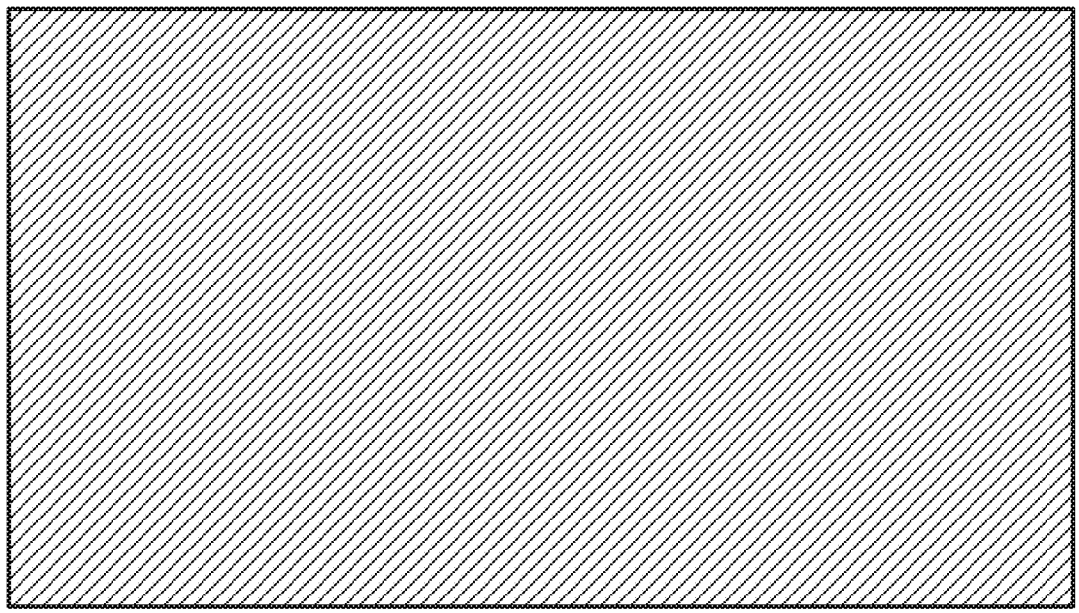
FIG. 7C is an example of a drawing explaining a display screen during darkening.

Thereafter, in cases in which the first condition (acquisition of all seven of the special items) is fulfilled, the first condition determination section 2171 performs a process that emphasizes the acquisition gauge 70 and the periphery thereof in the fight screen (FIG. 7B). The process that emphasizes the acquisition gauge 70 can be performed by increasing the brightness of the acquisition gauge 70 and the periphery thereof, overlaying and displaying an explosion mark 71 on the acquisition gauge 70 and the periphery thereof, or the like (FIG. 7B). The explosion mark 71 in FIG. 7B may be colored with an emphasized color or may flash in a predetermined pattern.

4-8. Superiority Gauge

The first condition determination section 2171 presents the degree of contribution of each character toward the fulfillment of the first condition (acquisition of all seven of the special items) to the first player and the second player. With this configuration, the first player and the second player can be provided with information for determining whether to attempt to acquire the bonus. For example, when the contribution of the player-character A to the fulfillment of the first condition (acquisition of all seven of the special items) is comparatively large, the first player can understand that there is a possibility of the cost (time and effort) spent theretofore being for nothing, and when the contribution of the player-character A to the fulfillment of the first condition (acquisition of all seven of the special items) is comparatively small, the first player can understand that there is a possibility of obtaining a large advantage at a low cost (time and effort). Additionally, when the contribution of the opponent-character E to the fulfillment of the first condition (acquisition of all seven of the special items) is comparatively large, the second player can understand that there is a possibility of the cost (time and effort) spent theretofore being for nothing, and when the contribution of the opponent-character E to the fulfillment of the first condition (acquisition of all seven of the special items) is comparatively small, the second player can understand that there is a possibility of obtaining a large advantage at a low cost (time and effort).

For example, the first condition determination section 2171 displays, in the acquisition gauge 70, a number of sphere-shaped marks corresponding to the special item acquisition count of the player-character A in a first color, and displays a number of sphere-shaped marks corresponding to the special item acquisition count of the opponent-character E in a second color. The first condition determination section 2171 allocates the left side of the acquisition gauge 70 (player-character A standing position side) to displaying of the special item acquisition count of the player-character A, and allocates the right side of the acquisition gauge 70 (opponent-character E standing position side) to displaying of the special item acquisition count of the opponent-character E. Moreover, the first condition determination section 2171 allocates the left end of the acquisition gauge 70 to a zero acquisition count of the player-character A, and allocates the right end of the acquisition gauge 70 to a zero acquisition count of the opponent-character E. In this case, the acquisition gauge 70 is provided with the functions of a gauge (superiority gauge) indicating the relationship between the magnitudes of the contributions of the player-character A and the opponent-character E to the fulfillment of the first condition (acquisition of all seven of the special items). For example, if the number of sphere-shaped marks displayed in the first color is greater than the number of sphere-shaped marks displayed in the second color, it can be determined that the degree of contribution of the player-character A is greater than the degree of contribution of the opponent-character E, and when the number of sphere-shaped marks displayed in the first color is less than the number of sphere-shaped marks displayed in the second color, it can be determined that the degree of contribution of the player-character A is less than the degree of contribution of the opponent-character E.

4-9. Specific Skills by Character

As illustrated in FIG. 6, the first condition determination section 2171 determines, by character, the actions required to fulfill the first condition (acquisition of all seven of the special items) (FIG. 6). Information (game data) indicating the specific skills by character is stored in the game data storage section 274. In the example illustrated in FIG. 6, the specific skills of player-character A are "high kick, leg sweep . . . ", and the specific skills of player-character B are "punch, elbow strike . . . ". Therefore, the first player must make the player-character A perform actions (specific skills) set for the player-character A to fulfill the first condition (acquisition of all seven of the special items), and the second player must make the opponent-character E (i.e., player-character of the second player) perform actions (specific skills) set for the opponent-character E to fulfill the first condition (acquisition of all seven of the special items). Accordingly, with the present embodiment, a situation can be created in which action tendencies during the fight differ by character.

4-10. Processing Related to Bonus Awarding and Bonus Selection

The bonus awarding section 2173 sets, as the fulfilling character, only the character, among the player-character A and the opponent-character E, that fulfills the second condition (recovery of the skill parameter) first after the fulfillment of the first condition (acquisition of all seven of the special items). In this case, the player-character A and the opponent-character E must compete (competition where the fastest character wins) to fulfill the second condition (recovery of the skill parameter) fastest after the fulfillment of the first condition (acquisition of all seven of the special items). Therefore, the first player and the second player can be prompted to shorten the time to fulfill the second condition (recovery of the skill parameter) after the fulfillment of the first condition (acquisition of all seven of the special items), and the feeling of speed of the fight can be enhanced.

When the player-character A is the fulfilling character, the bonus awarding section 2173 presents candidates for the bonus to the first player (i.e., the fulfilling player) in a selectable manner, and causes the first player to select a portion of the candidates as the bonus. When the opponent-character E is the fulfilling character, the bonus awarding section presents candidates for the bonus to the second player (i.e., the fulfilling player) in a selectable manner, and causes the second player to select a portion of the candidates as the bonus. Accordingly, the fulfilling player selects, as the bonus, an appropriate candidate from among the plurality of candidates, thereby making it possible to advantageously advance the subsequent fight. As such, the act of the fulfilling player selecting the bonus itself can dictate the direction of the fight.

Figure 8:
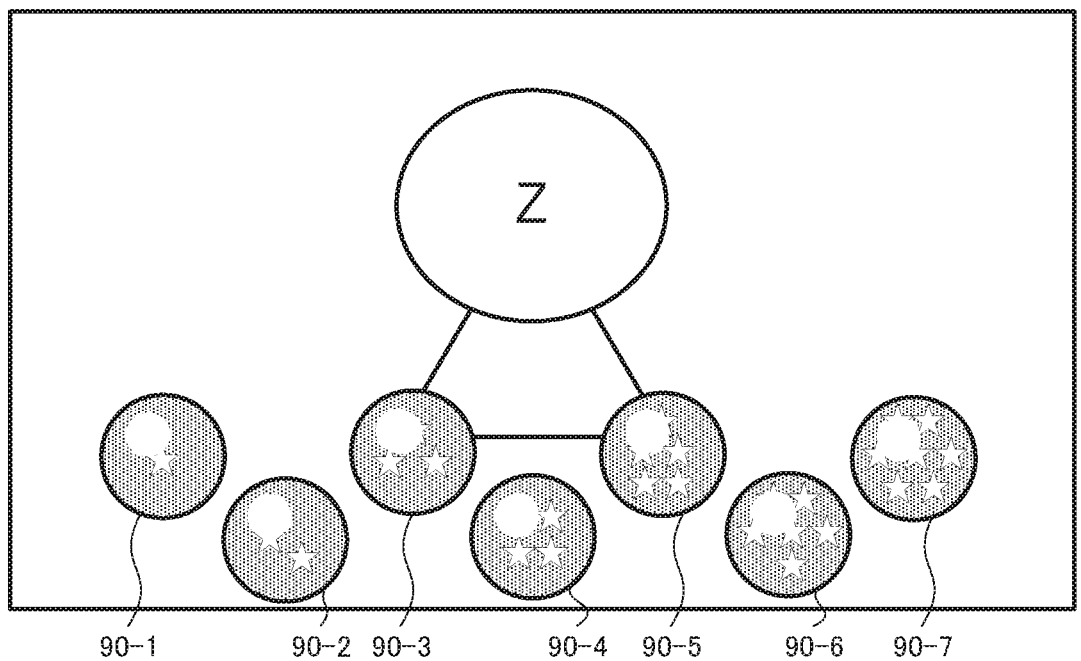
FIG. 8 is an example of a drawing explaining a bonus screen.
Figure 9:
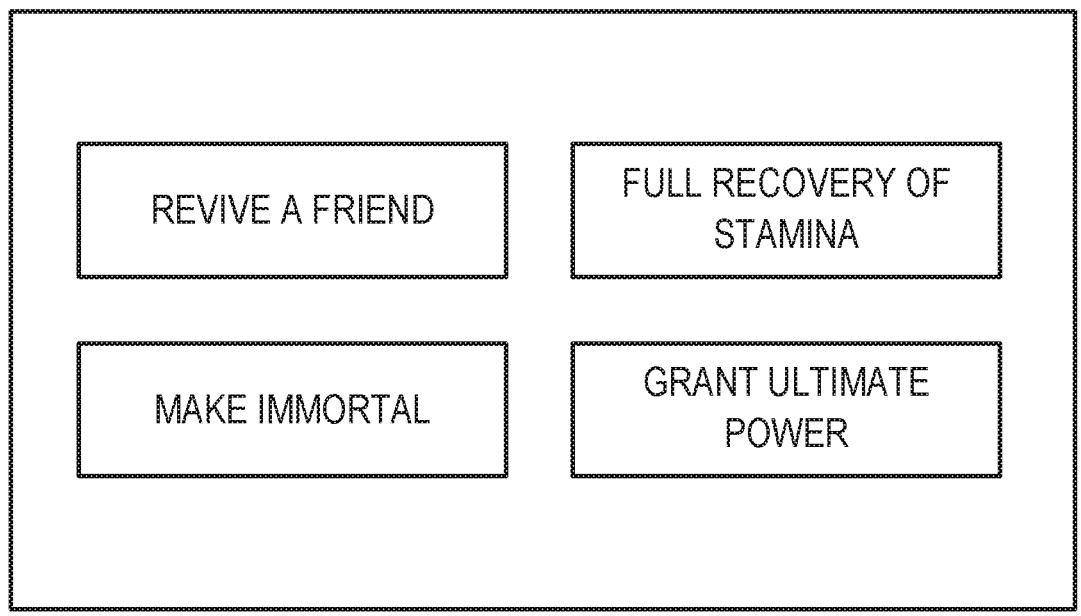
FIG. 9 is an example of a drawing explaining a bonus selection screen.

For example, the bonus awarding section 2173 performs processes related to bonus awarding and bonus selection according to procedures (1) to (7) below:

(1) Determine whether the first condition is fulfilled;

(2) Determine whether the second condition is fulfilled after the fulfillment of the first condition, and identify the fulfilling character (fulfilling player);

(3) Receive an operation command (call request) from the fulfilling player for calling the bonus screen;

(4) Darken screen (FIG. 7C) and display bonus screen (FIG. 8) (note that, the background of FIG. 8 is illustrated as a light portion, but may also be a darkened portion);

(5) Display a selection screen (FIG. 9) presenting the bonus candidates in a selectable manner (note that, in FIG. 9, an example is illustrated in which the selection screen and the bonus screen are different screens, but the selection screen may also be overlaid and displayed on the bonus screen);

(6) Receive an operation command of the fulfilling player specifying a bonus candidate; and (7) Cancel the darkening of the display screen (FIG. 9) and award the bonus candidate, specified by the fulfilling player, to the fulfilling character.

In a case in which a bonus has been awarded to a fulfilling character, the bonus awarding section 2173 may be configured to not award a bonus to a subsequent fulfilling character during a period until the end of the fight, even if another fulfilling character is generated. Specifically, the bonus awarding section 2173 may be configured to limit the number of times the bonus screen may be called during a fight to "1" and not perform the processes of procedures (4) to (7) in cases in which the fulfilling player does not input the call request of procedure (3). In this case, the opportunity to obtain a bonus by fulfilling the second condition is limited and, as such, the value of the bonus can be enhanced. Additionally, the fulfilling player can, at their own will, employ a strategy of reserving the use of the call request until a subsequent round. Moreover, the bonus awarding section 2173 may be configured such that the fulfilling player can transition, at their own will, to a non-fulfilling state of the second condition (i.e., the state of procedure (1)) by inputting a given command (e.g., lethal skill command) that consumes the skill gauge instead of inputting a call request.

4-11. Bonus Awarding and Bonus Selection

The bonus awarding section 2173 may perform the following process.

In one example, the bonus awarding section 2173 darkens the display screen of the display section 290 (FIG. 7C) after the fulfillment of the first condition (acquisition of all seven of the special items), and disallows the receiving of operation commands related to fighting actions from the first player and the second player. However, while the display screen is darkened, the bonus awarding section 2173 continues to receive operation commands related to the recovery of the skill parameter (recovery requests). In this case, the first player and the second player individually can repeatedly input recovery requests while the display screen is darkened (FIG. 7C), and can compete to fulfill the second condition (skill parameter recovery competition).

Additionally, while the display screen is darkened (FIG. 7C), the bonus awarding section 2173 monitors the skill parameter of the player-character A and the skill parameter of the opponent-character E, receives an operation command (call request) related to calling the bonus screen from the character (fulfilling character) whose skill parameter recovers to the maximum value first, and disallows the receiving of a call request from the other character (non-fulfilling character).

Note that, the bonus awarding section 2173 cooperates with the input reception processing section 213 to disallow the receiving of the various operation commands. In a case in which the recovery timings of the skill parameters of the player-character A and the opponent-character E match, the bonus awarding section 2173 may regard the character that was attacking the other character at the timing when the first condition was fulfilled as the fulfilling character.

Next, upon receipt of the call request from the fulfilling player, the bonus awarding section 2173 switches the display screen to the bonus screen (FIG. 8). A third character Z and images 90-1 to 90-7 of the seven special items are displayed in the bonus screen (FIG. 8). In one example, the third character Z is a divine character that grants the wish of the fulfilling character.

Then, for example, after displaying the bonus screen (FIG. 8) on the display section 290 for a set period of time, the bonus awarding section 2173 displays a bonus selection screen (FIG. 9) on the display section 290. A plurality of bonus candidates are displayed in the bonus selection screen (FIG. 9). As illustrated in FIG. 9, examples of the bonus candidates include "revive a friend", "full recovery of stamina", "make immortal", "grant ultimate power", and the like. These various bonus candidates are useful for advancing the fighting game in an advantageous manner.

In the example illustrated in FIG. 9, the plurality of bonus candidates are arranged on the display section 290 as text images. However, instead of or in addition to this manner of displaying, the plurality of bonus candidates may be sequentially output (read aloud) as voice data from the sound output section 292.

The bonus awarding section 2173 may set the voice, whereby the bonus candidates are to be read aloud, to a tone of voice (sound frequency spectrum) associated, in advance, with the fulfilling character. Information indicating the tone of voice by character is, for example, stored in advance in the character table (FIG. 6) together with the information indicating the specific skills by character.

When the bonus awarding section 2173 receives an operation command from the fulfilling player specifying a bonus candidate while the bonus candidates (FIG. 9) are displayed or while the bonus candidates are being read aloud, the bonus awarding section 2173 identifies the bonus candidate specified by the fulfilling player via the operation command, and awards the identified bonus candidate as a bonus to the fulfilling character.

Thereafter, the bonus awarding section 2173 returns the screen of the display section 290 to the fight screen (FIG. 7A) and cancels the disallowing of the receiving of the various operation commands from the first player and the second player. Note that, the bonus awarding section 2173 cooperates with the input reception processing section 213 to cancel the disallowing of the receiving of the various operation commands.

Additionally, the bonus candidates may include one or more of awarding a specific item (including a specific character, information, a skill, in-game currency, and the like), changing a specific parameter, changing the maximum value of a specific parameter, eliminating a specific object from the object space, changing a specific parameter of the opponent-character, changing the maximum value of a specific parameter of the opponent-character, stealing a specific item from the opponent-character, and the like.

4-12. Determination of the Bonus Candidates

The bonus awarding section 2173 may determine the candidates on the basis of the degree of contribution of the fulfilling character to the fulfillment of the first condition (acquisition of all seven of the special items). In this case, the degree of contribution (number of special items acquired) of the fulfilling character to the fulfillment of the first condition (acquisition of all seven of the special items) is related to the content of the bonus. As such, there is a possibility that the fulfilling player can recover the cost (time and effort) spent in the fulfillment of the first condition by the fulfilling character. In one example, as the degree of contribution increases, bonuses with greater effects are added as the bonus candidates.

In the present embodiment, an example of a case is described in which a plurality of bonus candidates (five or more bonus candidates) are stored, in advance, as a table in the game data storage section 274, and four bonus candidates are selected from the plurality of bonus candidates by the bonus awarding section 2173 and presented to the fulfilling player.

Each of the plurality of bonus candidates is given a level from 0 to 7. The level of the bonus candidate indicates the height of the effect of the bonus candidate (degree of benefit to the fight).

When the special item acquisition count of the fulfilling character is "0", the bonus awarding section 2173 sets the degree of contribution to the first condition (acquisition of all seven of the special items) to "0/7" and selects four bonus candidates from the bonus candidates of level 0 as the bonus candidates to be presented to the fulfilling player.

When the special item acquisition count of the fulfilling character is "1", the bonus awarding section 2173 sets the degree of contribution to the first condition (acquisition of all seven of the special items) to "1/7" and selects four bonus candidates from the bonus candidates of level 1 as the bonus candidates to be presented to the fulfilling player.

Likewise, when the special item acquisition count of the fulfilling character is "N" (where N=2, 3 . . . , 7), the bonus awarding section 2173 sets the degree of contribution to the first condition (acquisition of all seven of the special items) to "N/7" and selects four bonus candidates from the bonus candidates of level N as the bonus candidates to be presented to the fulfilling player.

4-13. Determination of Candidate Value

The bonus awarding section 2173 may determine the candidate value on the basis of the degree of contribution of the fulfilling character to the fulfillment of the first condition (acquisition of all seven of the special items). In this case, the degree of contribution of the fulfilling character to the fulfillment of the first condition (acquisition of all seven of the special items) is related to the value of the bonus. As such, there is a possibility that the first player can recover the cost (time and effort) spent by the player-character A in the fulfillment of the first condition, and there is a possibility that the second player can recover the cost (time and effort) spent by the opponent-character E in the fulfillment of the first condition. In one example, as the degree of contribution increases, the effects of the bonus candidates are enhanced.

In the present embodiment, an example of a case is described in which four bonus candidates are stored, in advance, as a table in the game data storage section 274, and the bonus awarding section 2173 sets the levels of the four bonus candidates before presenting the bonus candidates to the fulfilling player. Moreover, in this example, the four bonus candidates are "recover stamina", "raise attack strength", "raise defense strength", and "increase recovery speed."

Each of these four bonus candidates can be given a level from 0 to 7. The level stipulates the height of the effect of the bonus candidate (degree of benefit to the fight).

When the special item acquisition count of the fulfilling character is "0", the bonus awarding section 2173 sets the degree of contribution to the first condition (acquisition of all seven of the special items) to "0/7" and sets the level of each of the four bonus candidates to "0."

When the special item acquisition count of the fulfilling character is "1", the bonus awarding section 2173 sets the degree of contribution to the first condition (acquisition of all seven of the special items) to "1/7" and sets the level of each of the four bonus candidates to "1."

Likewise, when the special item acquisition count of the fulfilling character is "N" (where N=2, 3 . . . , 7), the bonus awarding section 2173 sets the degree of contribution to the first condition (acquisition of all seven of the special items) to "N/7" and sets the level of each of the four bonus candidates to "N."

4-14. Control of the Skill Parameter

In the present embodiment, the first condition determination section 2171 may allow each character to exchange a consumption of a given parameter assigned to each character for an action (specific skill) required to fulfill the first condition, and the second condition determination section 2172 may set the recovery of the given parameter as the second condition.

In the present embodiment, an example of a case is described in which the given parameter is the "skill parameter." For example, the consumption of the skill parameter may be required to perform the action (specific skill) required for the first condition.

In this case, consumption of the parameter is required to fulfill the first condition (acquisition of all seven of the special items), and recovery of the skill parameter is required to fulfill the second condition. As such, a trade-off relationship is established in which fulfillment of the second condition (recovery of skill parameter) by the player-character A becomes difficult if the player-character A excessively consumes the skill parameter to fulfill the first parameter (acquisition of all seven of the special items), and fulfillment of the first condition (acquisition of all seven of the special items) by the player-character A becomes difficult to fulfill if the player-character A excessively saves the skill parameter to fulfill the second condition (recovery of skill parameter).

Likewise, a trade-off relationship is established in which fulfillment of the second condition (recovery of skill parameter) by the opponent-character E becomes difficult if the opponent-character E excessively consumes the skill parameter to fulfill the first parameter (acquisition of all seven of the special items), and fulfillment of the first condition (acquisition of all seven of the special items) by the opponent-character E becomes difficult to fulfill if the opponent-character E excessively saves the skill parameter to fulfill the second condition (recovery of skill parameter).

Accordingly, interest in the act of obtaining the bonus itself is enhanced even more.

5. Flow (First Example

Figure 10:
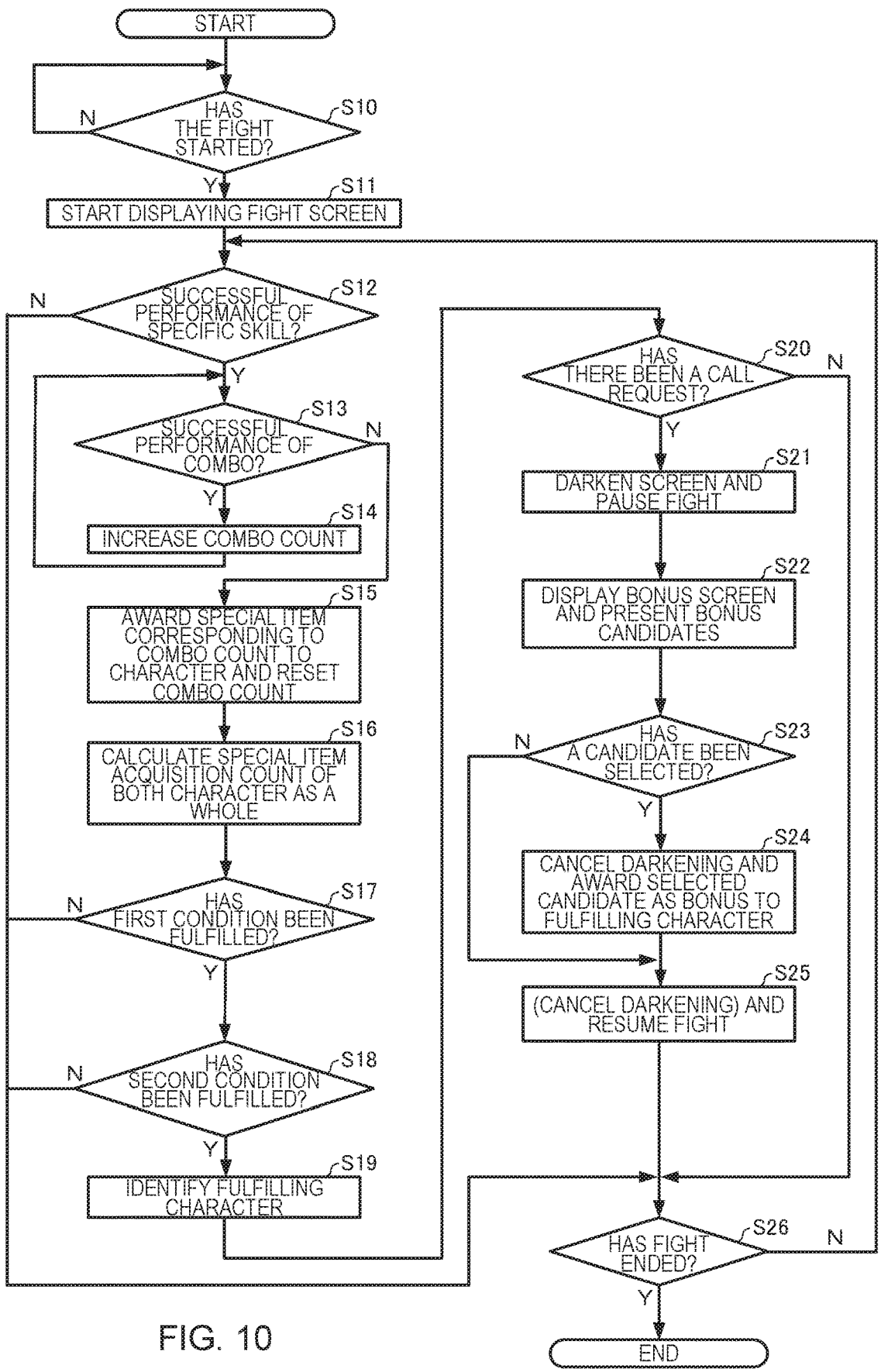
FIG. 10 is an example of a flowchart of the processing related to bonus awarding during the fight.

FIG. 10 is an example of a flowchart of the processing related to the bonus awarding during the fight. This processing is performed by the processing section 200 of the terminal device 20 after the determination of the player-character A and the opponent-character E involved in the fight. The assignments of the functions of the processing section 200 has already been described and, as such, the processing section 200 is described as the component performing the processing. Descriptions of processing that does not directly relate to the bonus awarding have been omitted. In one example, the series of processes of steps S12 to S25 described below is performed during the period after the start of the fight until the awarding of the bonus due to the fulfillment of the second condition. As such, the opportunity for a bonus award is limited to one time during the fight, which increases the value of the bonus.

First, the processing section 200 determines whether a start condition (e.g., agreement by both the first player and the second player to the fight) of the fighting game is fulfilled (S10). When the start condition is fulfilled (S11), the processing section 100 transitions to the next process (S11) and, when the start condition is not fulfilled (S12), the processing section 100 stands by.

Next, the processing section 200 starts the display of the fight screen (FIG. 7A) on the display section 290 (S11).

Next, the processing section 200 determines whether one of the player-character A and the opponent-character E involved in the fight has successfully performed a specific skill (S12). When a specific skill has been successfully performed (S12Y), the processing section 200 transitions to a combo determination process for that specific skill (S13) and, if a specific skill has not been successfully performed, the processing section 200 transitions to an end determination process (S26).

Next, the processing section 200 determines whether the character has successfully performed a combo by the specific skill (S13). When the character has successfully performed a combo by the specific skill (S13Y), the processing section 200 increments the "combo count by the specific skill" in the game data (FIG. 5) of the successful character by 1 (S14) and then returns to the combo by specific skill determination process (S13). When the character has not successfully performed a combo by the specific skill (S13N), the processing section 200 transitions to an item awarding process (S15).

Next, when the combo count by the specific skill is any of 10 to 17, the processing section 200 awards a special item to the successful character by adding the special item corresponding to the combo count by the specific skill to the items possessed by the successful character in the game data (FIG. 5) (S15). However, in the item awarding process (S15), when the special item is already added to the items possessed by either the player-character A or the opponent-character E involved in the fight, the processing section 200 does not award that special item to the successful character. When the combo count by the specific skill is not any of 10 to 79, the processing section 200 does not award a special item to the successful character. Note that, after the special item has been awarded, as required, to the successful character, the "combo count by specific skill" in the game data (FIG. 5) of the successful character is reset to zero.

Next, the processing section 200 calculates the special item acquisition count of the player-character A and the player-character E as a whole on the basis of the item inventories (FIG. 5) of the player-character A and the player-character E involved in the fight (S16).

Next, on the basis of the acquisition count calculated in the calculation process (S16), the processing section 200 determines whether the player-character A and the opponent-character E, as a whole, have fulfilled the first condition (the acquisition count has reached 7). When the first condition has been fulfilled (S17Y), the processing section 200 transitions to the next determination process (S18) and, when the first condition has not been fulfilled (S17N), the processing section 200 transitions to the end determination process (S26).

Next, the processing section 200 determines whether one of the player-character A and the opponent-character E has fulfilled the second condition (recovery of skill parameter). When the second condition has been fulfilled (S18Y), the processing section 200 transitions to an identification process (S19) and, when the second condition has not been fulfilled (S18N), the processing section 200 transitions to the end determination process (S26).

Next, the processing section 200 identifies the fulfilling character, among the player-character A and the opponent-character E involved in the fight, that first fulfills the second condition (S19), and transitions to a process for receiving a call request from the fulfilling character (S20).

Next, the processing section 200 determines whether the fulfilling player input a call request within, for example, a time limit (S20). When the input has occurred (S20Y), the processing section 200 transitions to the next darkening process (S21) and, when the input has not occurred (S20N), the processing section 200 transitions to the end determination process (S26). However, in this step (S20), when the input of the call request has not occurred and the time limit has not passed, the processing section 200 may transition to the determination process related to the second condition (S18) instead of transitioning to the end determination process (S26).

Next, the processing section 200 darkens the display screen (FIG. 7C), and temporarily disallows the receiving of operation commands related to fighting actions from the first player and the second player (S21).

Next, in correspondence with the call request from the fulfilling player, the processing section 200 displays the bonus screen (FIG. 8) on the display screen, determines the four bonus candidates according to one of the methods described above, and starts the read aloud the four bonus candidates in order to present the four determined bonus candidates to the fulfilling player (S22). Additionally, the processing section 200 displays the bonus selection screen including the four candidates (FIG. 9) on the display screen in order to present the four bonus candidates to the fulfilling player.

Next, the processing section 200 determines whether the fulfilling player has specified a bonus candidate from among the four present bonus candidates within a time limit (S23). When a bonus candidate has been specified (S23Y), the processing section 200 transitions to the next process (S24) and, when a bonus candidate has not been specified (S23N), the processing section 200 skips the bonus awarding process (S24) and transitions to a fight resume process (S25).

Next, the processing section 200 cancels the darkening of the screen, and awards the bonus candidate, specified by the fulfilling player, to the fulfilling character as the bonus (S24). The method for awarding the various bonuses to the characters is as described above.

Next, the processing section 200 optionally cancels the darkening of the screen, returns the display screen to the fight screen (FIG. 7A), and cancels the disallowing of the receiving of the various operation commands from the first player and the second player (S25). As a result, the fight is resumed.

Next, the processing section 200 determines whether a fighting game termination condition (the stamina parameter of one of the characters has been depleted or a predetermined time has passed since the start of the fighting game) has been satisfied (S26). When the fighting game termination condition has been satisfied (S26Y), the processing section 200 ends the processing flow and, when the fighting game termination condition has not been satisfied, the processing section 200 transitions to the initial determination process (S12).

Note that, the flow illustrated in FIG. 10 may be modified in part, provided that the functions of the flow are not impaired. Moreover, it is possible to omit the steps of a portion of the flow illustrated in FIG. 10.

6. Flow (Second Example

Figure 11:
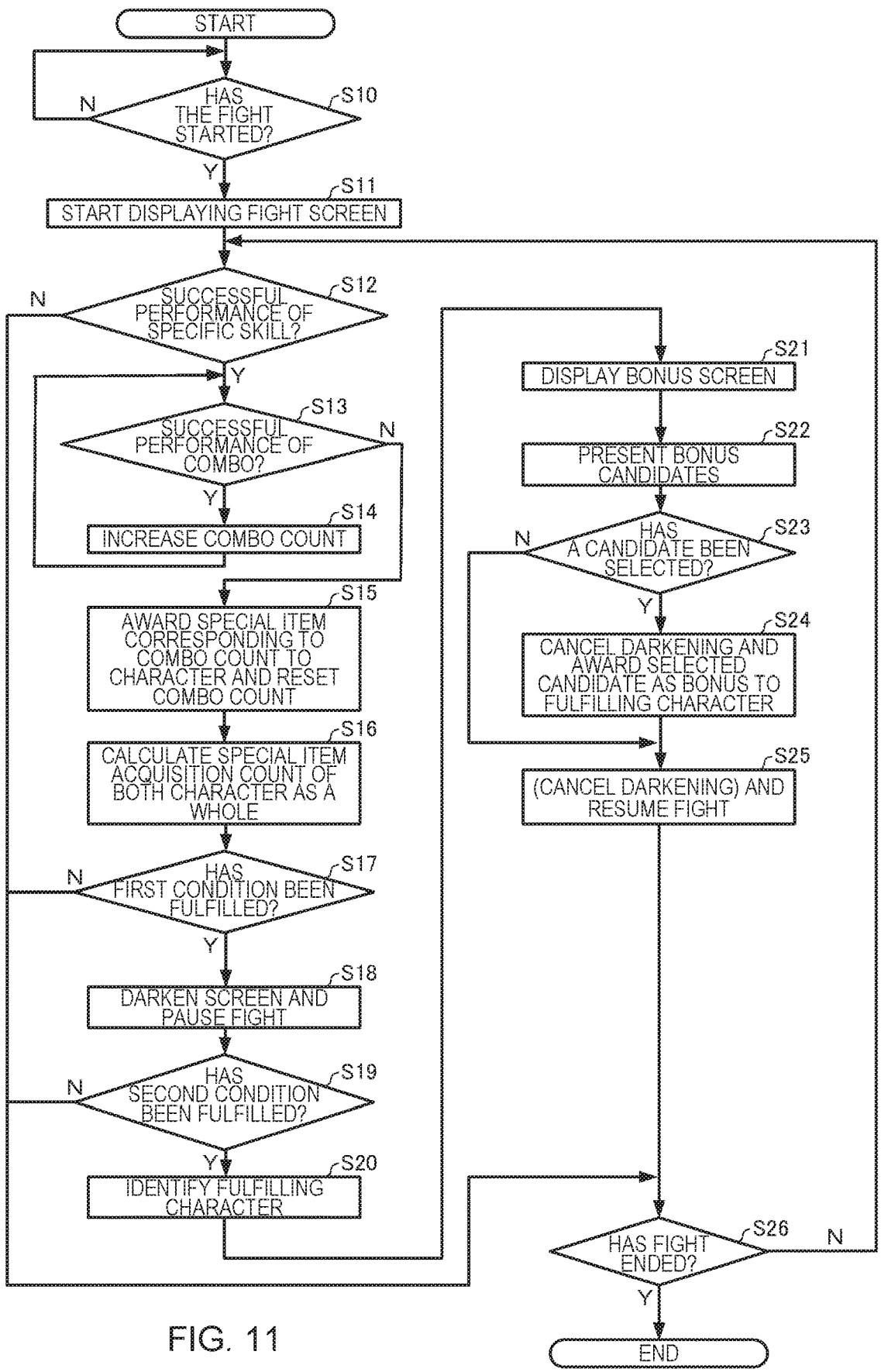
FIG. 11 is another example of a flowchart of the processing related to bonus awarding during the fight.

FIG. 11 is an example of a flowchart of the processing related to the bonus awarding during the fight. This processing is performed by the processing section 200 of the terminal device 20 after the determination of the player-character A and the opponent-character E involved in the fight. The assignments of the functions in the processing section 200 have already been described and, as such, the processing section 200 is described as the component performing the processing. Moreover, description of processing that does not directly relate to bonus awarding has been omitted. In one example, the series of processes of steps S12 to S25 described below is performed during the period after the start of the fight until the awarding of the bonus due to the fulfillment of the second condition. As such, the opportunity for a bonus award is limited to one time during the fight, which increases the value of the bonus.

First, the processing section 100 determines whether a start condition (e.g., agreement by both the first player and the second player to the fight) of the fighting game is fulfilled (S10). When the start condition is fulfilled (S11), the processing section 100 transitions to the next process (S11) and, when the start condition is not fulfilled (S12), the processing section 100 stands by.

Next, the processing section 200 starts the display of the fight screen (FIG. 7A) on the display section 290 (S11).

Next, the processing section 200 determines whether one of the player-character A and the opponent-character E involved in the fight has successfully performed a specific skill (S12). When a specific skill has been successfully performed (S12Y), the processing section 200 transitions to a combo determination process for that specific skill (S13) and, if a specific skill has not been successfully performed, the processing section 200 transitions to an end determination process (S26).

Next, the processing section 200 determines whether the character has successfully performed a combo by the lethal skill (S13). When the character has successfully performed a combo by the lethal skill (S13Y), the processing section 200 increments the "combo count by the specific skill" in the game data (FIG. 5) of the successful character by 1 (S14) and then returns to the combo by specific skill determination process (S13). When the character has not successfully performed a combo by the lethal skill (S13N), the processing section 200 transitions to an item awarding process (S15).

Next, when the combo count by the specific skill is any of 10 to 17, the processing section 200 awards a special item to the successful character by adding the special item corresponding to the combo count by the specific skill to the items possessed by the successful character in the game data (FIG. 5) (S15). However, in the item awarding process (S15), when the special item is already added to the items possessed by either the player-character A or the opponent-character E involved in the fight, the processing section 200 does not award that special item to the successful character. When the combo count by the specific skill is not any of 10 to 79, the processing section 200 does not award a special item to the successful character. Note that, after the special item has been awarded, as required, to the successful character, the "combo count by specific skill" in the game data (FIG. 5) of the successful character is reset to zero.

Next, the processing section 200 calculates the special item acquisition count of the player-character A and the player-character E as a whole on the basis of the item inventories of the player-character A and the player-character E involved in the fight (S16).

Next, on the basis of the acquisition count calculated in the calculation process (S16), the processing section 200 determines whether the player-character A and the opponent-character E, as a whole, have fulfilled the first condition (the acquisition count has reached 7). When the first condition has been fulfilled (S17Y), the processing section 200 transitions to the darkening process (S18) and, when the first condition has not been fulfilled (S17N), the processing section 200 transitions to the end determination process (S26).

Next, the processing section 200 darkens the display screen (FIG. 7C), and temporarily disallows the receiving of operation commands related to fighting actions from the first player and the second player (S18).

Next, while the display screen is darkened (FIG. 7C), the processing section 200 determines whether one of the player-character A and the opponent-character E has fulfilled the second condition (recovery of the skill parameter). When the second condition has been fulfilled (S19Y), the processing section 200 transitions to an identification process (S20) and, when the second condition has not been fulfilled (S19N), the processing section 200 transitions to the end determination process (S26).

Next, the processing section 200 identifies the fulfilling character, among the player-character A and the opponent-character E involved in the fight, that first fulfills the second condition, and receives a call request from the fulfilling character (S20).

Next, the processing section 200 displays the bonus screen (FIG. 8) on the display screen in accordance with the call request from the fulfilling player (S21).

Next, the processing section 200 determines the four bonus candidates according to one of the methods described above, and starts reading aloud the four bonus candidates in order to present the four determined bonus candidates to the fulfilling player (S22). Additionally, the processing section 200 displays the bonus selection screen including the four candidates (FIG. 9) on the display screen in order to present the four bonus candidates to the fulfilling player.

Next, the processing section 200 determines whether the fulfilling player has specified a bonus candidate from among the four present bonus candidates within a time limit (S23). When a bonus candidate has been specified (S23Y), the processing section 200 transitions to the next process (S24) and, when a bonus candidate has not been specified (S23N), the processing section 200 skips the bonus awarding process (S24) and transitions to a fight resume process (S25).

Next, the processing section 200 cancels the darkening of the screen, and awards the bonus candidate, specified by the fulfilling player, to the fulfilling character as the bonus (S24). The method for awarding the various bonuses to the characters is as described above.

Next, the processing section 200 optionally cancels the darkening of the screen, returns the display screen to the fight screen (FIG. 7A), and cancels the disallowing of the receiving of the various operation commands from the first player and the second player (S25). As a result, the fight is resumed.

Next, the processing section 200 determines whether a fighting game termination condition (the stamina parameter of one of the characters has been depleted or a predetermined time has passed since the start of the fighting game) has been satisfied (S26). When the fighting game termination condition has been satisfied (S26Y), the processing section 200 ends the processing flow and, when the fighting game termination condition has not been satisfied, the processing section 200 transitions to the initial determination process (S12).

Note that, the flow illustrated in FIG. 11 may be modified in part, provided that the functions of the flow are not impaired. Moreover, it is possible to omit the steps of a portion of the flow illustrated in FIG. 11.

7. Effects

As described above, with the present embodiment, when (i) the player-character A fulfills the first condition, (ii) the opponent-character E fulfills the first condition, or (iii) the player-character A and the opponent-character E cooperate to fulfill the first condition, a bonus is awarded to the fulfilling character that fulfills the second condition. Specifically, this embodiment has a configuration in which the player-character A and the opponent-character E must, as a whole, fulfill the first condition for the player-character A to obtain a bonus. However, provided that the player-character A fulfills the second condition after the fulfillment of the first condition, the player-character A can obtain a bonus regardless of the degree of contribution of the player-character A to the fulfillment of the first condition. As such, to advance the fighting game in an advantageous manner, the first player must develop a strategy to engage the player-character A in the fulfillment of the second condition after the fulfillment of the first condition, or a strategy to prevent the engagement of the opponent-character E in the fulfillment of the second condition after the fulfillment of the first condition. This description applies to the second player as well. As a result, the first player and the second player can be provided with a fighting game rich with strategic diversity and excitement due to the direction of the fight being difficult to predict and the provision of a wide range of strategic possibilities. Moreover, the set of conditions must be fulfilled in order to fulfill the first condition and, as such, a given cost (time and effort) is required for the fulfillment of the first condition. Accordingly, when a character contributes to the fulfillment of the first condition but does not achieve fulfillment of the second condition, the loss feeling (feeling of loss) of the player controlling that character can be increased, and when a character does not contribute to the fulfillment of the first condition but achieves fulfillment of the second condition, the advantage feeling (feeling of advantage) of the player controlling that character can be increased.

8. Modification Examples 8-1. Modification Examples of First Condition and Second Condition In the embodiment described above, an example is described in which the first condition is the acquisition of all seven of the special items and the second condition is the recovery of the skill parameter. However, a configuration is possible in which the first condition determination section 2171 sets the partial fulfillment of a given set of conditions (the acquisition of all seven of the special items) as the first condition, and the second condition determination section 2172 sets the fulfillment of the remaining condition of the set of conditions (the acquisition of all seven of the special items) as the second condition. For example, a configuration is possible in which the set of conditions is the acquisition of all seven of the special items, the first condition is the acquisition of any six of the seven special items, and the second condition is the acquisition of the final one of the seven special items.

In this case, each condition of the set of conditions must be fulfilled in order to fulfill the second condition and, as such, a given cost (time and effort) is required.

Accordingly, when the player-character A contributes to the fulfillment of many of the conditions of the set of conditions but does not achieve fulfillment of the remaining condition, the loss feeling (feeling of loss) of the first player can be increased, and when the player-character A does not contribute to the fulfillment of the many of the conditions of the set of conditions but achieves fulfillment of the remaining condition, the advantage feeling (feeling of advantage) of the first player can be increased.

Likewise, when the opponent-character E contributes to the fulfillment of many of the conditions of the set of conditions but does not achieve fulfillment of the remaining condition, the loss feeling (feeling of loss) of the second player can be increased, and when the opponent-character E does not contribute to many of the conditions of the set of conditions but achieves fulfillment of the remaining condition, the advantage feeling (feeling of advantage) of the second player can be increased.

8-2. Variations of the Special Item Acquisition Method

In the embodiment described above, a "combo attack by a specific skill set by character" is set as the action of the player-character required for special item acquisition.

At least one of the specific skills required for special item acquisition may be a specific skill that requires consumption of the skill gauge (consumption of the skill parameter), or may be a specific skill for which the consumption amount of the skill gauge (consumption amount of the skill parameter) is a certain amount of greater (or may be a lethal skill).

Moreover, at least one specific skill required for special item acquisition may be duplicated between multiple characters.

Additionally, the number of types of specific skills required for special item acquisition may be one for each character.

Furthermore, the specific skill required for special item acquisition may be an arbitrary skill (a skill arbitrarily selected by a player) instead of a specific skill.

Moreover, the combo count required for the $N^{th}$ special item acquisition is not limited to (10N) to (10N+9)-combos, and other numerical ranges or numerical values may be used.

Additionally, the attacks required for special item acquisition are not limited to combo attacks. For example, "successful performance of a specific skill requiring the consumption of the skill gauge" or "successful performance of a lethal skill" may be used.

Furthermore, an action other than a fighting action (e.g., already having 1 or 2 or more special items) may be added as the action of the player-character required for special item acquisition.

Moreover, the action of the player-character required for special item acquisition may be set by character as in the embodiment described above or, conversely, may be set to be the same for the characters.

Additionally, the action of the player-character required for special item acquisition may be set to be the same for the special items, or may be set by special item.

Furthermore, the operation of the player required for special item acquisition may be set by character or may be set to be the same for the characters.

Moreover, the operation of the player required for special item acquisition may be set by special item or may be set to be the same for the special items.

8-2-1. Other Examples of Special Item Acquisition Methods

For example, in cases such as when the player-character performs a specific attack action (e.g., special combo attack) in correspondence with a given operation input by a player, various special items may be awarded to the player-character in the following order.

(1) During the fight, when a player-character successfully performs the attack a first time, the fourth special item is awarded to that player-character.

(2) During the fight, when a player-character successfully performs the attack a second time, the second special item is awarded to that player-character.

(3) During the fight, when a player-character successfully performs the attack a third time, the fifth special item is awarded to that player-character.

(4) During the fight, when a player-character successfully performs the attack for the fourth time, the third special item is awarded to that player-character.

(5) During the fight, when a player-character successfully performs the attack for the fifth time, the sixth special item is awarded to that player-character.

(6) During the fight, when a player-character successfully performs the attack for the sixth time, the seventh special item is awarded to that player-character.

(7) During the fight, when a player-character successfully performs the attack for the seventh time, the first special item is awarded to that player-character.

In this case, the order for awarding the special items is the fourth special item, the second special item, the fifth special item, the third special item, the sixth special item, the seventh special item, and then the first special item. However, the order may be changed to a different order.

8-3. Multiple Character Fights

In the embodiment described above, an example is described mainly for "one character vs. one character" fights. However, "multiple characters vs. one character" fights or "multiple characters vs. multiple character" fights are also possible.

Specifically, a configuration is possible in which at least one of the players involved in the fight sequentially controls a plurality of characters. In one example, the plurality of characters controllable by the player are registered in deck data that is set in advance by the player. When one of the characters registered in the deck data is defeated, a character registered in the deck data that has not yet fought is put into the fight. Thus, in this case, the fight in the embodiment described above does not end until all of the plurality of characters registered in the deck data of the player have been defeated. Moreover, provided that the fight has not ended and the wish event (described above) has not occurred even once, there is a possibility that the wish event will occur. However, only one of each of the first special item, the second special item, the third special item, the fourth special item, the fifth special item, the sixth special item, and the seventh special item can be acquired per fight (only one of each of the seven special items exists in the object space of the fight).

8-4. Team Play

When the fight described above is set to a "multiple characters vs. one character" fight or a "multiple characters vs. multiple characters" fight, a plurality of players forming a team may participate in the fight. In this case, the server device 10 may provide an opposing team to the plurality of terminal devices 20 individually used by the plurality of players. In this case, the main functions of the terminal device 20 of the embodiment described above may be implemented on the server device 10 side, and the various terminal devices 20 may cooperate with the server device 10 to provide the fighting game to each player. The plurality of players can sequentially participate in the fight via the terminal device 20 of each player. Alternatively, the same fighting game may be implemented by directly connecting the plurality of terminal devices 20 individually used by the plurality of players, without interposing the server device 10. The functions of the server device 10 may be implemented in any one of the plurality of terminal devices 20, or the functions of the server device 10 may be distributed among the plurality of terminal devices 20.

8-5. Computer Fights

In the embodiment described above, a configuration is possible in which one of the characters of the fight is set as an NPC, and the fight is set as a computer fight.

9. Other

The invention is not limited to the embodiments described above. Various modifications and variations may be made of the embodiments described above. Any term cited with a different term having a broader meaning or the same meaning at least once in the specification and the drawings may be replaced by the different term in any place in the specification and the drawings.

For example, in the embodiment described above, the various games may be provided to the terminal device 20 by one server device 10, or a plurality of server devices 10 may be linked to form a server system and this server system may provide various games to the terminal device 20.

Furthermore, in the embodiment described above, the fighting game is executed by the terminal device 20, but a portion of the functions of the terminal device 20 may be implemented on the server device 10 side. The terminal device 20 may implement the game by executing image display by operation input and streaming.

In the embodiment described above, the terminal device of the invention is applied to a game device, but is not limited thereto. The terminal device of the invention can be applied to any type of terminal device whereby operation input can be performed using a touch panel such as a smartphone, a tablet information terminal device, a personal computer, a monitor, or a television.

The invention includes various other configurations substantially the same as the configurations described above in connection with the embodiments (e.g., a configuration having the same function, method, and results, or a configuration having the same objective and effects). The invention also includes a configuration in which an unsubstantial element described above in connection with the embodiments is replaced by another element. The invention also includes a configuration having the same effects as those of the configurations described above in connection with the embodiments, or a configuration capable of achieving the same objective as that of the configurations described above in connection with the embodiments. The invention further includes a configuration in which a known technique is added to the configurations described above in connection with the embodiments.

Although only some embodiments of the invention have been described in detail above, those skilled in the art would readily appreciate that many modifications are possible in the embodiments without materially departing from the novel teachings and advantages of the invention. Accordingly, all such modifications are intended to be included within the scope of the invention.

What is claimed is:

1. A non-transitory computer-readable information storage medium storing a program for a computer that executes processing of a fighting game in which a player-character is made to fight an opponent-character,
the program causing the computer to:
calculate, by the computer, periodically or each time the player-character or the opponent-character acquires a special item via the fighting game, a special item acquisition count of the player-character and the opponent-character, and determine whether or not the player-character and the opponent-character, as a whole, have fulfilled a first condition during the fight, wherein the first condition relates to the special item acquisition count; then
automatically determine, by the computer, a character, among the player-character and the opponent-character, that is first to fulfill a second condition during the fight, wherein the second condition is recovery of a skill parameter; and
award, by the computer, a bonus configured for use in the fight to a fulfilling character, among the player-character and the opponent-character, that is first to fulfill the second condition after the fulfillment of the first condition,
wherein the program further causes the computer to set a partial or a complete fulfillment of a given set of conditions as the first condition.

2. The information storage medium as defined in claim 1, wherein the program further causes the computer to set fulfillment of the given set of conditions as the first condition.

3. The information storage medium as defined in claim 1, wherein the program further causes the computer to
set partial fulfillment of the given set of conditions as the first condition, and
set fulfillment of a remaining condition of the set of conditions as the second condition.

4. The information storage medium as defined in claim 1, wherein the program further causes the computer to present whether or not the first condition is fulfilled or a degree of fulfillment of the first condition to a player.

5. The information storage medium as defined in claim 4, wherein the program further causes the computer to present, to the player, a degree of contribution to the fulfillment of the first condition by each of the player-character and the opponent-character.

6. The information storage medium as defined in claim 5, wherein the program further causes the computer to determine an action required to fulfill the first condition for each of the player-character and the opponent-character.

7. The information storage medium as defined in claim 1, wherein the program further causes the computer to set, as the fulfilling character, only a character, among the player-character and the opponent-character, that fulfills the second condition first after the fulfillment of the first condition.

8. The information storage medium as defined in claim 1, wherein the program further causes the computer to, present, when the player-character is the fulfilling character, candidates for the bonus to the player in a selectable manner, and cause the player to select a portion of the candidates as the bonus.

9. The information storage medium as defined in claim 8, wherein the program further causes the computer to determine the candidates based on a degree of contribution of the fulfilling character to the fulfillment of the first condition.

10. The information storage medium as defined in claim 8, wherein the program further causes the computer to determine a value of the bonus based on a degree of contribution of the fulfilling character to the fulfillment of the first condition.

11. The information storage medium as defined in claim 1, wherein the program further causes the computer to
allow each of the player-character and the opponent-character to exchange a consumption of a given parameter assigned to each of the player-character and the opponent-character for an action required to fulfill the first condition, and
set a recovery of the given parameter as the second condition.

12. The information storage medium as defined in claim 1, wherein the program further causes the computer to, in a case in which the bonus has been awarded to the fulfilling character, not award the bonus to a subsequent fulfilling character during a period until an end of the fight, even if a fulfilling character is generated.

13. An information processing device that executes processing of a fighting game in which a player-character is made to fight an opponent-character, the device comprising:
a processor configured to
calculate, periodically or each time the player-character or the opponent-character acquires a special item via the fighting game, a special item acquisition count of the player-character and the opponent-character, and determine whether or not the player-character and the opponent-character, as a whole, have fulfilled a first condition during the fight, wherein the first condition relates to the special item acquisition count; then
automatically determine a character, among the player-character and the opponent-character, that has is first to fulfill a second condition during the fight, wherein the second condition is recovery of a skill parameter; and
award configured for use in the fight to a fulfilling character, among the player-character and the opponent-character, that is first to fulfill the second condition after the fulfillment of the first condition.

14. The information processing device as defined in claim 13, wherein the processor is further configured to set fulfillment of the given set of conditions as the first condition.

15. The information processing device as defined in claim 13, wherein the processor is further configured to
set partial fulfillment of the given set of conditions as the first condition, and
set fulfillment of a remaining condition of the set of conditions as the second condition.

16. The information processing device as defined in claim 13, wherein the processor is further configured to present whether or not the first condition is fulfilled or a degree of fulfillment of the first condition to a player.

17. A game system that executes processing of a fighting game in which a player-character is made to fight an opponent-character, the game system comprising:

a processor configured to calculate, periodically or each time the player-character or the opponent-character acquires a special item via the fighting game, a special item acquisition count of the player-character and the opponent-character, and determine whether or not the player-character and the opponent-character, as a whole, have fulfilled a first condition during the fight, wherein the first condition relates to the special item acquisition count; then automatically determine a character, among the player-character and the opponent-character, that is first to fulfill a second condition during the fight, wherein the second condition is recovery of a skill parameter; and award a bonus configured for use in the fight to a fulfilling character, among the player-character and the opponent-character, that is first to fulfill the second condition after the fulfillment of the first condition.

18. The game system as defined in claim 17, wherein the processor is further configured to set fulfillment of the given set of conditions as the first condition.

19. The game system as defined in claim 17, wherein the processor is further configured to set partial fulfillment of the given set of conditions as the first condition, and set fulfillment of a remaining condition of the set of conditions as the second condition.

20. The game system as defined in claim 17, wherein processor is further configured to present whether or not the first condition is fulfilled or a degree of fulfillment of the first condition to a player.

* * * * *